US010622201B2

(12) United States Patent
Franjic

(10) Patent No.: US 10,622,201 B2
(45) Date of Patent: Apr. 14, 2020

(54) METHOD AND SYSTEM FOR PRODUCING LASER ABLATION PLUMES WITHOUT ABLATION RECOIL PRODUCTS

(71) Applicant: Kresimir Franjic, Toronto (CA)

(72) Inventor: Kresimir Franjic, Toronto (CA)

(73) Assignee: SYNAPTIVE MEDICAL (BARBADOS) INC., Bridgetown (BB)

( * ) Notice: Subject to any disclaimer, the term of this patent is extended or adjusted under 35 U.S.C. 154(b) by 0 days.

(21) Appl. No.: 16/320,976

(22) PCT Filed: Jul. 25, 2017

(86) PCT No.: PCT/CA2017/050897
§ 371 (c)(1),
(2) Date: Jan. 25, 2019

(87) PCT Pub. No.: WO2018/018147
PCT Pub. Date: Feb. 1, 2018

(65) Prior Publication Data
US 2019/0172697 A1  Jun. 6, 2019

(30) Foreign Application Priority Data

Jul. 25, 2016 (CA) .................................. 2937046

(51) Int. Cl.
*H01J 49/26* (2006.01)
*H01J 49/16* (2006.01)
*H01J 49/14* (2006.01)
*H01J 49/04* (2006.01)
*G01N 1/42* (2006.01)
*G01N 1/28* (2006.01)

(52) U.S. Cl.
CPC .............. *H01J 49/26* (2013.01); *G01N 1/286* (2013.01); *G01N 1/42* (2013.01); *H01J 49/0463* (2013.01); *H01J 49/145* (2013.01); *H01J 49/165* (2013.01); *H01J 49/168* (2013.01)

(58) Field of Classification Search
USPC ....................................................... 250/288
See application file for complete search history.

(56) References Cited

U.S. PATENT DOCUMENTS 6,635,226 B1  10/2003  Tso et al.
7,259,845 B2   8/2007  Dietz et al.
(Continued)

FOREIGN PATENT DOCUMENTS

CA  2328110 A1  11/1999

OTHER PUBLICATIONS

PCT ISR and Written Opinion from PCT/CA2017/050897 dated Nov. 27, 2017, 8 pgs.

*Primary Examiner* — Kiet T Nguyen

(57) ABSTRACT

A method for preparing thin layers from liquid samples is disclosed. Such thin layers can be useful when analyzing samples with probes whose penetration length in these samples is short The method consists of squeezing a certain amount of a liquid sample between two approximately flat and parallel surfaces separated by a small distance then cooling down the liquid sample until it freezes in a way that the frozen sample adheres only to one of these two flat surfaces. Removing the non-adhered flat surface leaves the frozen sample layer with the thickness approximately equal to the initial distance between the two parallel surfaces.

17 Claims, 22 Drawing Sheets

(56) References Cited

U.S. PATENT DOCUMENTS

| | | | |
|---|---|---|---|
| 2002/0076824 A1* | 6/2002 | Haglund, Jr. | G01N 27/44717 436/174 |
| 2017/0004959 A1* | 1/2017 | O'Brien | H01J 49/167 |

* cited by examiner

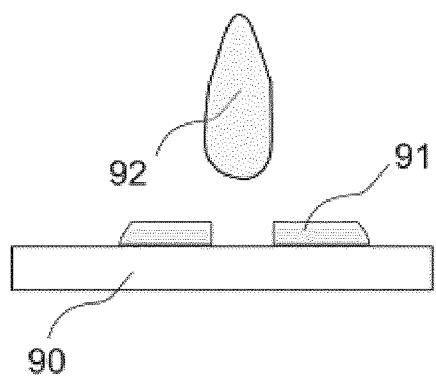
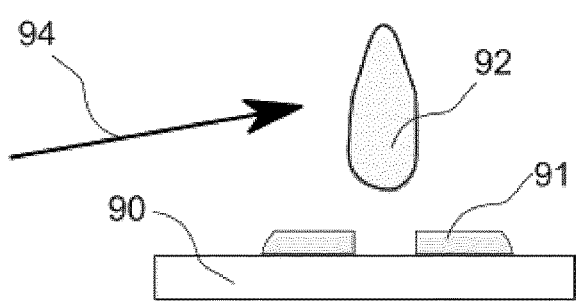
FIG.8A                FIG.8B
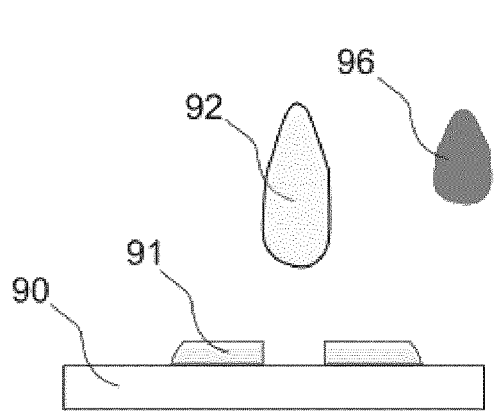
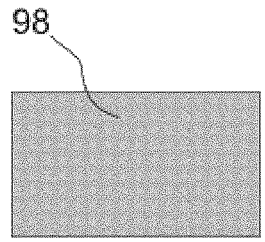
FIG.8C

METHOD AND SYSTEM FOR PRODUCING LASER ABLATION PLUMES WITHOUT ABLATION RECOIL PRODUCTS

FIELD OF THE INVENTION

The present invention relates to a method and system for producing laser ablation plumes without ablation recoil products.

BACKGROUND OF THE INVENTION

There is a need for having liquid samples arranged in thin layers for their analysis. One of the reasons is that the useful propagation length within a sample of either an agent that modifies the sample before the analysis or a useful signal used in the analysis is often short. If the sample thickness is significantly bigger than this propagation length, the signal of interest can be distorted or diminished due to prolonged interactions with the sample or due to background noise pick up. For example, if a liquid sample is ablated with a laser and the sample thickness is significantly longer than the absorption length of the laser beam inside the sample, the analysis of the laser ablation plume can be hindered by the presence of the ablation recoil products that increase in amount with the sample thickness. These ablation recoil products are generated by impulsive momentum transfer from the primary laser ablation plume that expands rapidly shortly after the onset of laser ablation to the underlying sample. In case the used sample is soft (e.g. tissues or liquids), the recoil stress is typically strong enough to rapture the underlying sample and eject the fractured material into the secondary ablation plume consisting of recoil products. The recoil energy is not big enough for vaporization of the recoil products so these recoil products are a mixture of individual molecules, molecular clusters, and particulates of various sizes (typically 0.1-1 um range). In contrast to the composition of the primary plume which is well defined and function of the laser pulse energy, the mixture composition of the secondary plume is not. Since these two kinds of plumes occur close in time and space, it is not easy to separate their contribution to probe signals. This reduces the signal-to-noise ratio of acquired signals hence the phenomenon of secondary ablation plumes is not desirable when quantitative high-quality signals are looked for. A discussion of the drawbacks of the presence of laser ablation recoil products is found in the publication by: Kresimir Franjic and R. J. Dwayne Miller, "Vibrationally excited ultrafast thermodynamic phase transitions at the water/air interface"; Phys. Chem. Chem. Phys., 2010, 12, 5225-5239. Particularly, as shown in the time progression photographs of a water plume formed by a pulsed laser (FIG. 9 of this publication), the plume remains intact until about 1 microsecond after irradiation and then the plume disintegrates due to recoil. As noted above this is a typical result when the sample thickness is significantly longer than the absorption length of the laser beam inside the sample.

Another desirable feature of thin sample layers and the corresponding small layer volumes is reduced sample consumption. This feature can be substantial when analyzing samples that are expensive or available in small quantities, such as bioliquids.

Another desirable feature is simplicity and universality of sample preparation. Biological samples are often fragile, and many current sample preparation techniques involve complicated steps that are sample dependent. Such elaborate steps may introduce undesirable sample modifications and complicate interpretation of acquired data.

SUMMARY OF THE INVENTION

A further understanding of the functional and advantageous aspects of the disclosure can be realized by reference to the following detailed description and drawings.

BRIEF DESCRIPTION OF THE DRAWINGS

Embodiments will now be described, by way of example only, with reference to the drawings, which are illustrative of the disclosure and are not to be construed as limiting the scope of the application:

FIGS. 8A to 8C show schematic drawings of a laser ablation produced plume of a sample undergoing ionization by an ionizing agent prior to analysis by a mass spectrometer.

DETAILED DESCRIPTION OF THE INVENTION

Figure 1A:
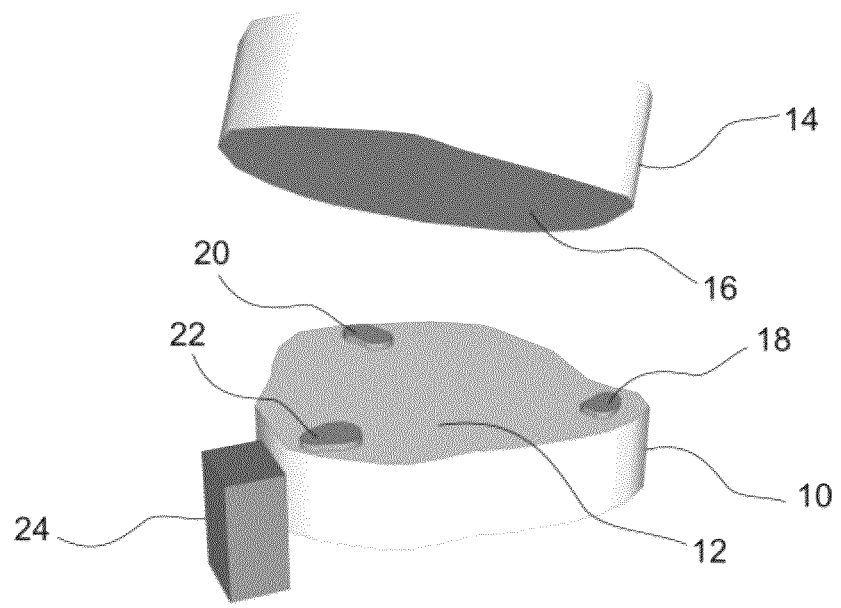
FIG. 1A shows a perspective view of a substrate and cover spaced apart with the substrate having spacers.

Various embodiments and aspects of the disclosure will be described with reference to details discussed below. The following description and drawings are illustrative of the disclosure and are not to be construed as limiting the disclosure. The drawings are not necessarily to scale. Numerous specific details are described to provide a thorough understanding of various embodiments of the present disclosure. However, in certain instances, well-known or conventional details are not described in order to provide a concise discussion of embodiments of the present disclosure.

As used herein, the terms, "comprises" and "comprising" are to be construed as being inclusive and open ended, and not exclusive. Specifically, when used in this specification including claims, the terms, "comprises" and "comprising" and variations thereof mean the specified features, steps or components are included. These terms are not to be interpreted to exclude the presence of other features, steps or components.

As used herein, the term "exemplary" means "serving as an example, instance, or illustration," and should not be construed as preferred or advantageous over other configurations disclosed herein.

As used herein, the terms "about" and "approximately", when used in conjunction with ranges of dimensions of particles, compositions of mixtures or other physical properties or characteristics, are meant to cover slight variations that may exist in the upper and lower limits of the ranges of dimensions so as to not exclude embodiments where on average most of the dimensions are satisfied but where statistically dimensions may exist outside this region. It is not the intention to exclude embodiments such as these from the present disclosure.

As used herein, the term "approximately same thickness", when used in reference to the one or more solid spacers, should be construed as meaning that the variation of the spacer thickness is such that variance of thickness of the formed sample layer is smaller than a predetermined number.

As used herein the phrase "biofluid sample" refers to any biofluid to be tested, including urine, serum, plasma, saliva, blood, (e.g. baby's blood during newborn screening), cerebral spinal fluid, breast milk, or lymph.

As used herein, the phrase "flat surface" refers to a surface whose root mean square (RMS) surface flatness is smaller than 50% of the maximum allowed RMS variation in the thin sample thickness which is decided by the experimenter for the specific experiment. Measurement of surface RMS is described in literature (e.g. Yoshizawa, Toru, ed. Handbook of optical metrology: principles and applications. CRC Press, 2009) and known to a person skilled in the art. In case the flat surface is optically reflective, it is possible to use the definition of flatness used for optical surfaces and which is based on measuring interference fringes when the surface is brought in close contact with an optical flat. Such measurements are also known to a person skilled in the art. For example, if maximum allowed thin sample layer RMS thickness is 200 nm over the entire thin film area, an optically flat surface with lambda/4 flatness should be sufficient. Optical surfaces with flatness much better than that (lambda/10) are readily available from optics vendors. The method and device disclosed herein address the deleterious issue of the presence of ablation recoil products which arise when liquid samples are subjected to laser ablation when the laser pulses hit the liquid surface.

The present method of laser ablation of a bioliquid sample which avoids production of ablation recoil products, comprises a) preparing a thin solid layer of a bioliquid sample by
i) providing a substrate member having an flat surface and a cover member having an optically flat surface, and one of said substrate and cover members having spacers of preselected thickness on its flat surface such that when said substrate and cover members are aligned and mated with said flat surfaces facing each other said substrate and cover members are separated by distance equal to the preselected thickness of said spacers, ii) depositing a sample volume of the bioliquid sample on the flat surface of the substrate member and mating the cover member to the substrate member to sandwich the biosample between the flat surfaces, and securing the substrate and cover member together;

b) cooling the substrate and cover members to a temperature below a freezing point of the biosample to freeze the biosample thereby forming a solid thin film of biosample of thickness substantially equal to the preselected thickness of said spacers;

c) removing the cover member to expose the frozen thin film of biosample;

d) irradiating the frozen thin film of biosample with a pulsed laser, said preselected thickness of the frozen thin film of bio-sample is selected such that an absorption length of light emitted by the pulsed laser in the frozen thin film of biosample is of an order of the preselected thickness such that an ablation plume of the biosample is released from the frozen thin film of biosample which is characterized by a lack of ablation recoil products.

In an embodiment the flat surfaces of the substrate and cover in contact with the liquid and then frozen sample are optically flat.

This method advantageously produces a laser ablation plume which is characterized by having the same composition as the solid film, which would not be the case were the recoil products formed during the process.

Details of the pulsed laser parameters for used in producing plumes in aqueous based liquid samples can be found in Kresimir Franjic and R. J. Dwayne Miller, "Vibrationally excited ultrafast thermodynamic phase transitions at the water/air interface"; Phys. Chem. Chem. Phys., 2010, 12, 5225-5239. For example, the present method is predicated upon the thickness of the frozen thin film of biosample being selected such that an absorption length of light emitted by the pulsed laser in the frozen thin film of biosample is of the order of this sample thickness. Any type of the laser capable of ablating biosamples that are known to a person skilled in the art can be used the thin sample layer ablation. In the preferred embodiment, pulsed infrared lasers are used whose pulse duration $\Delta \tau_{IR}$ is on the order of $d_{TF}/v_S$ where $d_{TF}$ is the thickness of the sample layer and $v_S$ is the speed of sound in the layer. In this case, the laser ablation occurs impulsively creating the minimum damage to the sample as discussed in K. Franjic, et al. "Laser selective cutting of biological tissues by impulsive heat deposition through ultrafast vibrational excitations." Optics express 17.25 (2009): 22937-22959; and K. Franjic, and R J D. Miller. "Vibrationally excited ultrafast thermodynamic phase transitions at the water/air interface." Physical Chemistry Chemical Physics 12.20 (2010): 5225-5239. In this case, the laser wavelength is chosen to correspond to one of the dominant molecular vibrational transitions in the sample. For biological samples, these laser wavelengths are typically $\lambda=2.9$ μm for the stretching and $\lambda=6.1$ μm for the bending mode, $\lambda=6.1$ μm for the amide I-band and $\lambda=6.4$ μm for the amide II-band, and around $\lambda=9.5$ μm for the phosphate modes. The laser pulse energy should be big enough so the enthalpy density within the excited portion of the thin sample film immediately after laser pulse absorption is bigger than the enthalpy of vaporization of the sample material. The models and approaches for calculating enthalpy density as well as calculating and measuring kinetics and dynamics the laser plumes are extensively covered in K. Franjic, et al. "Laser selective cutting of biological tissues by impulsive heat deposition through ultrafast vibrational excitations." Optics express 17.25 (2009): 22937-22959; and K. Franjic, and R J D. Miller. "Vibrationally excited ultrafast thermodynamic phase transitions at the water/air interface." Physical Chemistry Chemical Physics 12.20 (2010): 5225-5239.

Referring generally to FIGS. 1A to 1D an embodiment of the device for forming a thin liquid sample is shown. The device contains a base substrate member 10 having at least one substantially flat substrate surface 12; a cover member 14 having at least one approximately flat surface 16; spacers 18, 20, and 22 with approximately the same thickness; and a temperature control system comprising a cooler 24, whose temperature can be controlled and which can be placed in direct or indirect thermal contact with substrate 10 thus allowing cooling the substrate surface 12. In an embodiment, mechanical support structures may be configured to the substrate 12 and the cover 14 to assist in the positioning and manipulating of the substrate and cover.

Figure 1B:
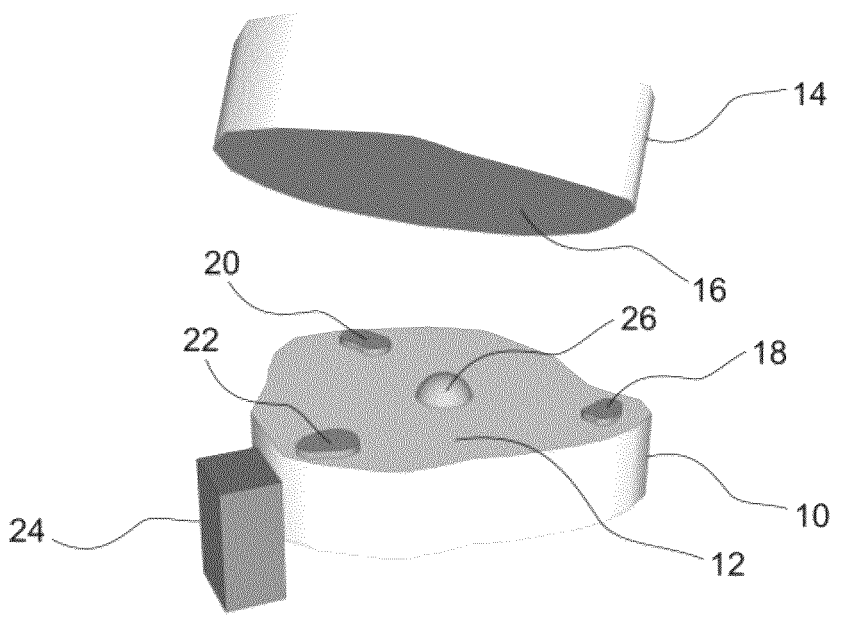
FIG. 1B is similar to FIG. 1A but with a drop of liquid sample on the substrate.
Figure 1C:
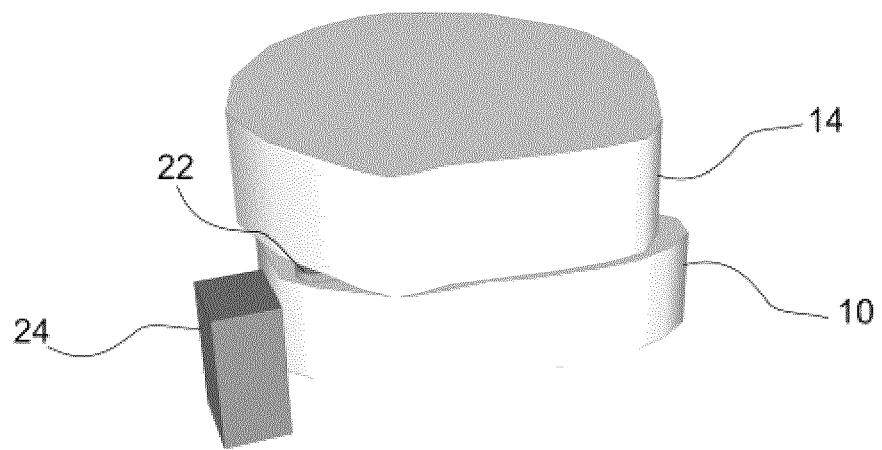
FIG. 1C shows the substrate and cover of FIG. 1A but with the substrate and cover closed sandwiching the liquid droplet sample therebetween.

Referring to FIG. 1B, a certain volume of a sample liquid 26 is deposited on the flat surface 12 of the substrate 10 with deposited liquid sample thickness being not smaller than the thickness of the spacers 18, 20, and 22. The temperature of the flat surface 12 is kept high enough at the moment of the sample deposition so the sample 26 remains liquid immediately after the deposition. Subsequently, the cover member 14 is brought in close vicinity of the substrate 10 in a way that its flat surface 16 faces the flat surface 12; and with the spacers 18, 20, and 22 placed between these two flat surfaces 12 and 16; and with spacers 18, 20, and 22 touching both of these flat surfaces 12 and 16 as shown in FIG. 1C. In this way, the flat surfaces 12 and 16 become approximately parallel with the distance between these two flat surfaces being approximately equal to the thickness of the spacers 18, 20, and 22. This causes the liquid sample to get spread into a liquid layer between two flat surfaces 12 and 16 with the liquid layer thickness being approximately equal to the thickness of the spacers 18, 20, and 22.

Then, the temperature of the flat surface 12 of the substrate 10 is reduced by reducing the temperature of the cooler 24 that is placed in thermal contact with the substrate 10. Referring to FIG. 1A, the thermal contact between the cooler 24 and the substrate 10, which reduces the substrate temperature may be realized through either a direct contact or through an indirect contact by placing the cooler 24 in direct contact with other components of the system that are in thermal contact with the substrate 10. In one non-limiting example, the cooler 24 of the temperature control system may be placed in thermal contact with the mechanical support structures for the substrate 10; with the cover 14; or mechanical support structures for the cover 14.

As the liquid layer is in thermal contact with the flat surface 12, reduction in the temperature of the flat surface 12 of the substrate 10, it is possible to induce the liquid sample layer to freeze and thus form a solid layer comprised of the frozen liquid sample. This layer will have a thickness approximately equal to the thickness of the spacers 18, 20, and 22. Freezing temperature will exist for any liquid sample. The liquid temperature can be lower than the standard freezing point of the liquid. In this case we say that the liquid is super-cooled.

The approximate initial volume of the liquid sample needed to create a frozen sample layer of a certain size can be easily estimated. If a layer with a thickness t and approximate diameter d is suitable for the system, the approximate volume of the liquid sample needed is:

$$V=t\pi(d/2)^2$$

In one non-limiting example, a layer with thickness of 2 μm and 10 mm would have a approximately suitable sample volume of 160 nL. Volumes of these sizes can be easily measured and deposited with standard laboratory pipettes.

The volume of the formed frozen film can be slightly different than the thickness of the initial liquid layer because densities of the liquid and solid phases are typically different. For example, the density of water ice is about 8% lower compared to the liquid water at 0° C. Change in volume during the freezing process manifests itself with slight change of the layer thickness and diameter. These changes are small (typically a few %) and deterministic so they can be tolerated and accounted for in an experimental analysis.

Figure 1D:
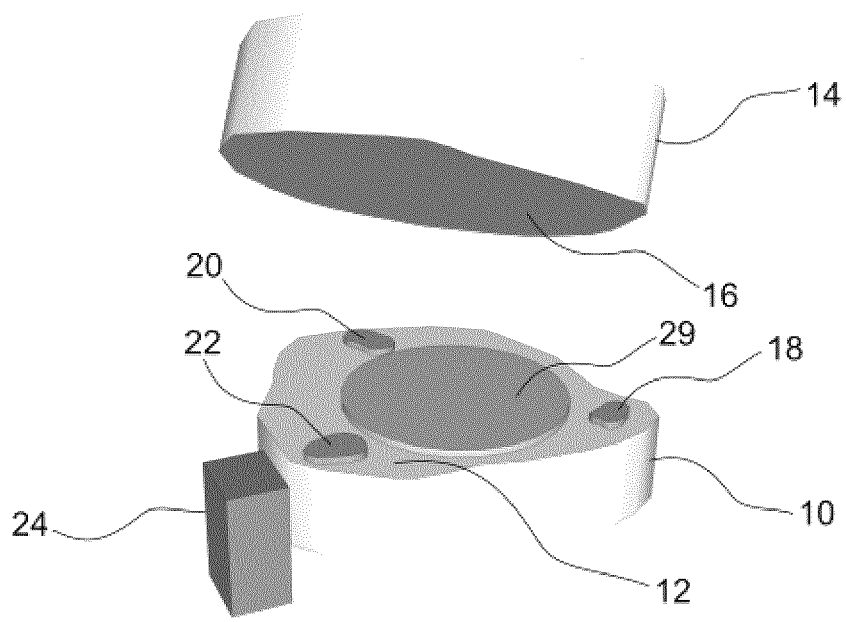
FIG. 1D show a schematic of the substrate and cover of FIG. 1A separated with a frozen liquid sample located on the substrate.

Referring to FIG. 1D, once the sample becomes frozen, the cover 14 is removed leaving the frozen sample layer 29 behind at the flat surface 12. The flat surfaces 12 and 16 and the freezing process have to be designed in a way that the frozen layer 29 gets adhered only to the flat surface 12 of the substrate 10 and not adhered to the flat surface 16 of the cover 14. Generally, any frozen substance will adhere, to at least some degree, to any solid surface that is in contact with that substance during the freezing process. This freezing based adhesion can be improved by matching the properties of the substrate to the properties of the liquid sample. For example, in case of liquid samples that contain a substantial amount of water, the adhesion of the frozen sample layer to the substrate can be improved by choosing a substantially hydrophilic material (such as sapphire) as the composition material of the substrate 10.

The issue of over-adhesion between the frozen layer and the cover 14 may be addressed by modifying the flat surface of the cover in a way to reduce the adhesion forces, thereby reducing that adhesion between the surface of the cover 14 and the frozen liquid sample. In one non-limiting example, the flat surface is coated with a thin coating that has low adhesion to the frozen sample layer. An example of such a coating material is AF teflon. AF Teflon coatings as described in this non-limiting example can be produced such that the resultant coatings are chemically inert.

In an additional embodiment, the adhesion of the frozen sample layer to the cover 14 may be reduced by structuring the flat surface of the cover 14 to resemble the surface structure of a lotus leaf as thoroughly discussed in Feng, Lin, et al. "Super-hydrophobic surfaces: from natural to artificial." Advanced materials 14.24 (2002): 1857-1860.

In an additional embodiment, the adhesion of the frozen sample layer to the cover 14 may be reduced or avoided through implementing a mechanical disturbance as described previously for inducing the freezing of a supercooled liquid layer. If such mechanical disturbance is created in a way that cover 14 moves during the freezing process, formation of adhesion chemical bonds between the sample layer and the cover 14 may be suppressed if kinetic energy of the moving cover exceeds the energy of the adhesion bonds which form during the freezing process.

In an embodiment, the adhesion of the frozen sample layer to the cover 14 may be reduced or prevented through the creation of a temperature gradient within the sample frozen layer and between the substrate 10 and the cover 14. The temperature gradient is established in a way that the only region of the sample layer that has temperature above the standard freezing temperature is a thin sub-layer immediately adjacent to the cover 14 while the rest of the sample layer is frozen. The adhesion force between the cover 14 and the sample layer will be small since adhesion of a liquid substance to a solid object is generally weaker compared to adhesion of a frozen substance to that solid object.

Figure 4A:
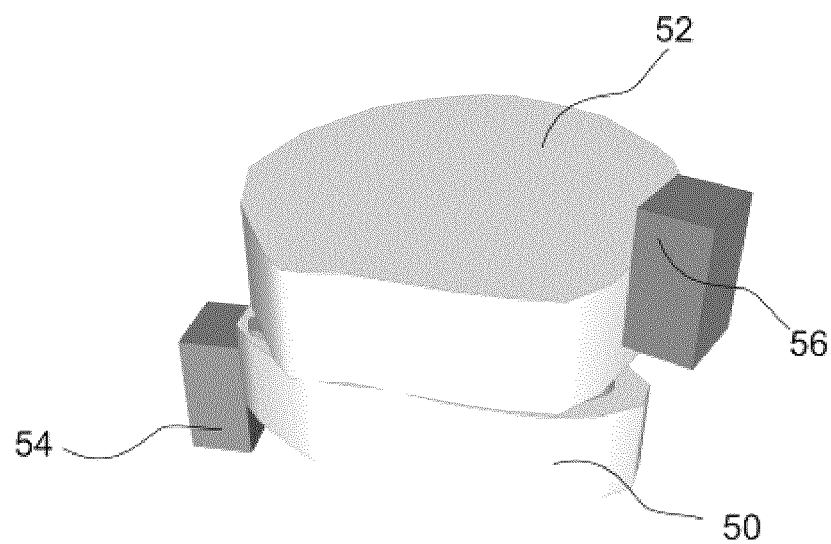
FIG. 4A shows perspective view of an assembled substrate and cover with both having cooling/heating devices attached.
Figure 4B:
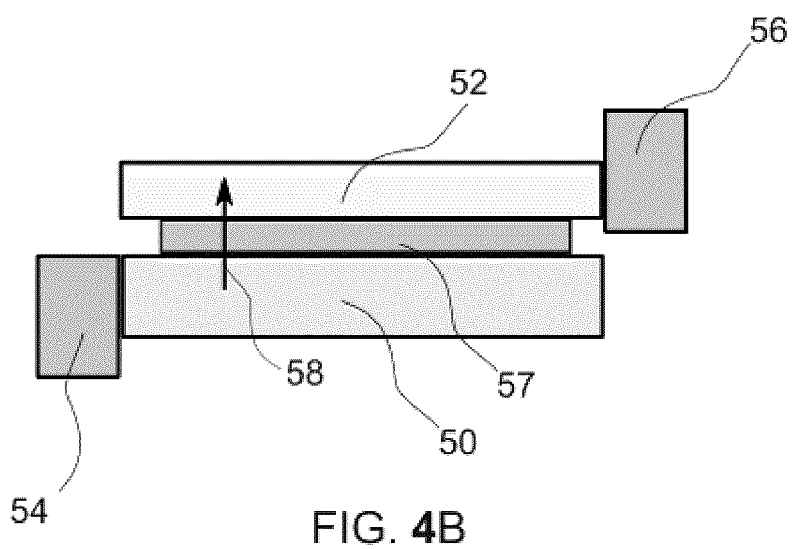
FIG. 4B shows a side elevational view of the assembled substrate and cover of FIG. 4A showing a frozen solid sample layer sandwiched therebetween.
Figure 4C:
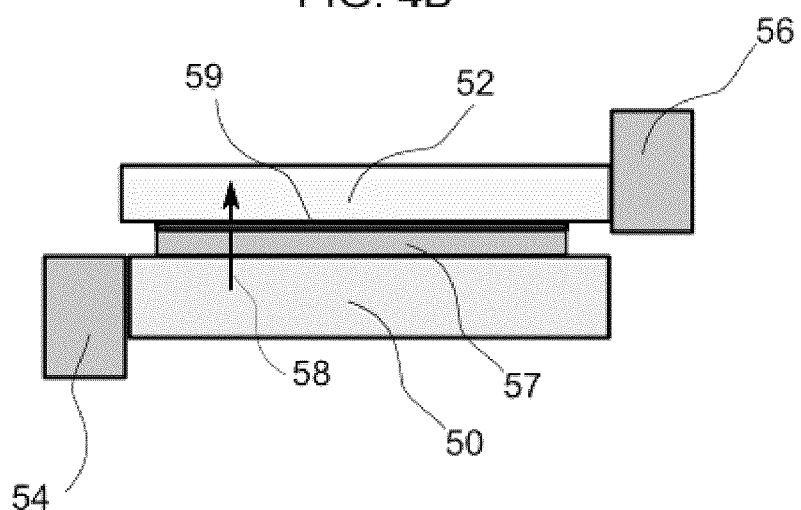
FIG. 4C shows a side elevational view of the assembled substrate and cover of FIG. 4A showing a frozen solid sample layer sandwiched therebetween but with a heater heating the cover to melt a top layer of the frozen sample indicated by the dark black line so that the cover can be easily removed.

The thickness of the liquid sub-layer should be significantly smaller than the thickness of the spacers; thus, removing the cover 14 will only disrupt geometry only of a small portion of the sample while the majority of the sample will remain in the form frozen film with thickness approximately equal to the thickness of the spacers. A possible procedure for establishing such temperature distribution within the sample layer is shown in FIGS. 4A to 4C. The substrate 50, cover 52, and cooler 54 correspond to substrate 10, cover 14, and cooler 24 described in relation to FIGS. 1A to 1D. The procedure consists of decreasing the temperature of the liquid sample layer 29 squeezed between the substrate 50 and the cover 52 by using a cooler 54 until the sample layer 57 is frozen. In the following step, the temperature of the cover 52 is gradually increased using an additional heater element 56 that is placed in direct or indirect thermal contact with the cover 52; while at the same time, the temperature of the substrate 50 is kept below the standard freezing temperature by using the cooler 54.

This process will lead to different temperatures for the substrate 50 and cover 52; and thus to a temperature gradient 58 within the liquid sample 57 that is in thermal contact with the base and cover objects. If the temperature of the cover 52 is raised sufficiently and slow enough to achieve approximate uniform temperature distribution at the interface between the cover 52 and frozen sample layer 57, at certain moment the temperature of the sub-layer 59 of frozen sample layer 57 that is in touch with the cover 52 will be big enough to cause melting of the sub-layer 59 while the rest of the sample 57 is still frozen. The melting of the sample sub-layer 59 that is in touch with cover 52 significantly reduces adhesion of the sample layer 57 to the cover 52 making possible the cover 52 removal while leaving the frozen part of the sample 57 adhered to the substrate 50. Removal of cover 52 can be facilitated by additional elements which exert a small force on the cover 52 away from the frozen layer (for example, a set of springs).

Once a frozen sample layer is formed and exposed after removing the cover 52, there is the potential for undesirable, gradual change of the frozen layer thickness and composition. This gradual change can occur when the partial vapor pressure of some of the constituents the frozen sample layer immediately above the sample layer is different than the saturation vapor pressure at the local temperature. In this case, there is a difference between fluxes of the constituent molecules that get evaporated from the sample layer and those constituent molecules that get condensed on the sample layer; if this difference between the fluxes is large, the geometry and composition of the sample layer may significantly change during the sample analysis process which is not desirable.

The sample constituents that can be typically out of such evaporation/condensation balance are matrix materials consisting of light molecules such as water or alcohol. The sample constituents that have unknown properties and are subject of analysis are typically made of heavy molecules which don't evaporate easily. The physics of evaporation and condensation of this process is well known to the person having ordinary skill in the art. The suitable smoothness of the flat surfaces 12 of substrate 10 and surface 16 of the cover 14 in FIGS. 1A to 1D depends on the application requirements and dimensional tolerances for the deposited frozen sample layer. In an embodiment of the device, certain surface structuring of either flat surface 12 or flat surface 16 can be created to be useful for subsequent sample layer modification or analysis.

In the embodiment described above, there are three spacers 18, 20, and 22 indicated. However, the number, shape, and layout of the spacers is not constrained. In the various embodiments of the device, there may be one or many spacers and the one or more solid spacers may be a variety of geometric shapes and arrangements.

In order to achieve accurate forming of the thin sample layer, the thicknesses of solid spacers shall be approximately equal to the desired thickness of the formed frozen sample layer. Also, the one or more spacer must be formed or arranged so that the spacers provide at least three stable points of contact for each of the flat surfaces 12 and 16. This enables the substrate 10 and cover 14 have stable positions relative to each other during the freezing process.

In an embodiment, unwanted contact between the liquid sample spreading between the substantially flat surfaces and the one or more spacers is prevented to limit contamination of the spacers. This unwanted contact is prevented by controlling the maximum layer diameter of the liquid sample by measuring the sample volume as described above; and by controlling the position of the sample layer by choosing an spot for liquid sample deposition on the flat surface 12 so that the formed sample layer doesn't touch any of the spacers.

Figure 2A:
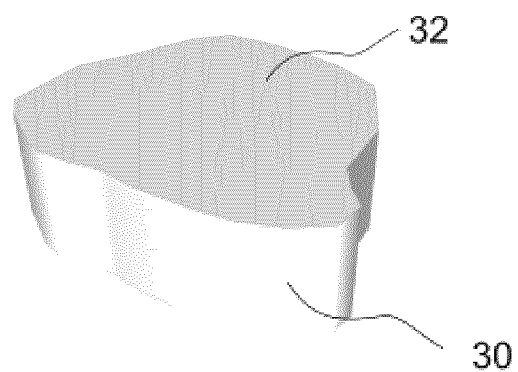
FIG. 2A shows a schematic of a coated substrate (or cover) surface from which thin spacers are to carved out of the coated surface.
Figure 2B:
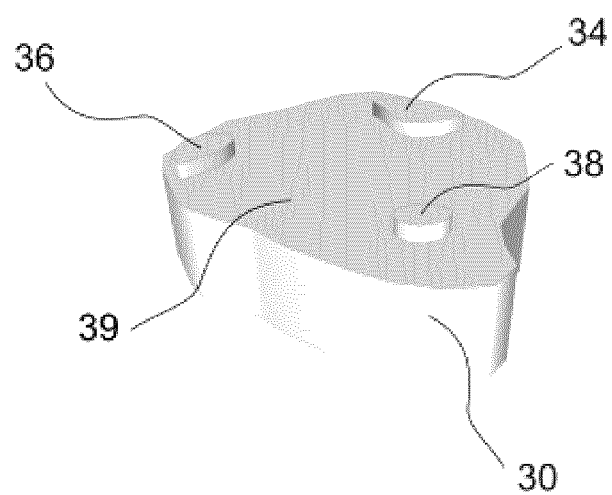
FIG. 2B shows the final substrate or cover with spacers.

In an embodiment, the one or more spacers are permanently attached to either flat surface 12 or flat surface 16. In this embodiment, the spacer forms are carved or etched out of either substrate 10 or cover 14. Referring to FIGS. 2A and 2B, a process of producing spacers 34, 36 and 38 (same as spacers 18, 20 and 22 in FIG. 1B) is shown. Generally, the procedure starts from substrate 30, with an approximately flat surface 32 and layers of uniform thickness are sequentially removed from a portion of the flat surface 32 with the exception of portions 34, 36 and 38. The portions 34, 36, 38 of the initial flat surface 32 that are left untouched have the role of spacers 18, 20, and 22 described in relation to FIGS. 1A to 1D. Techniques for such surface modifications are known to a person skilled in the art. The removal of the layers of uniform thickness may be achieved through various etching techniques such as dry etching of silicon and fluid jet polishing. In this way, the spacers 34, 36 and 38 are formed as part of the cover 14 or substrate 10.

Freezing of the Liquid Sample

For any liquid form of a substance, there exists a super-cooling temperature limit. These substances cannot be cooled as a super-cooled liquid to an arbitrary low temperature at certain pressure. Below the super-cooling temperature limit of a liquid substance, such substance can exist only in a solid form. In practice, a liquid sample usually freezes at a temperature that is between the standard freezing point and the super-cooling temperature limit. The freezing event occurs when there is a disturbance in the super-cooled liquid that induces and generates initial nucleation points. As the freezing event is triggered by random molecular fluctuations within the super-cooled liquid, the freezing temperature will fluctuates for different sample layer depositions as the generation of initial nucleation sites in the super-cooled liquid is objectively random. If the frozen liquid sample is to be analyzed, it is desirable to have reproducible sample preparation procedure including a predetermined sample freezing temperature.

In an embodiment, a reproducible freezing temperature is accomplished by creating a controllable disturbance of the super-cooled liquid layer squeezed between the cover and base surfaces that generates initial nucleation sites. In an additional embodiment, the controllable disturbances can be accomplished by mechanical tapping the cover or the substrate by a mechanical tool while a super-cooled sample layer is squeezed between the cover and base surfaces.

In another embodiment, the freezing process of the super-cooled liquid sample layer is induced through the use of an ultrasonic transducer that is acoustically coupled to the super-cooled liquid either through the substrate or the cover. Launching a continuous or pulsed ultrasound wave into the super-cooled liquid creates a sufficient disturbance that leads to liquid freezing.

Figure 3:
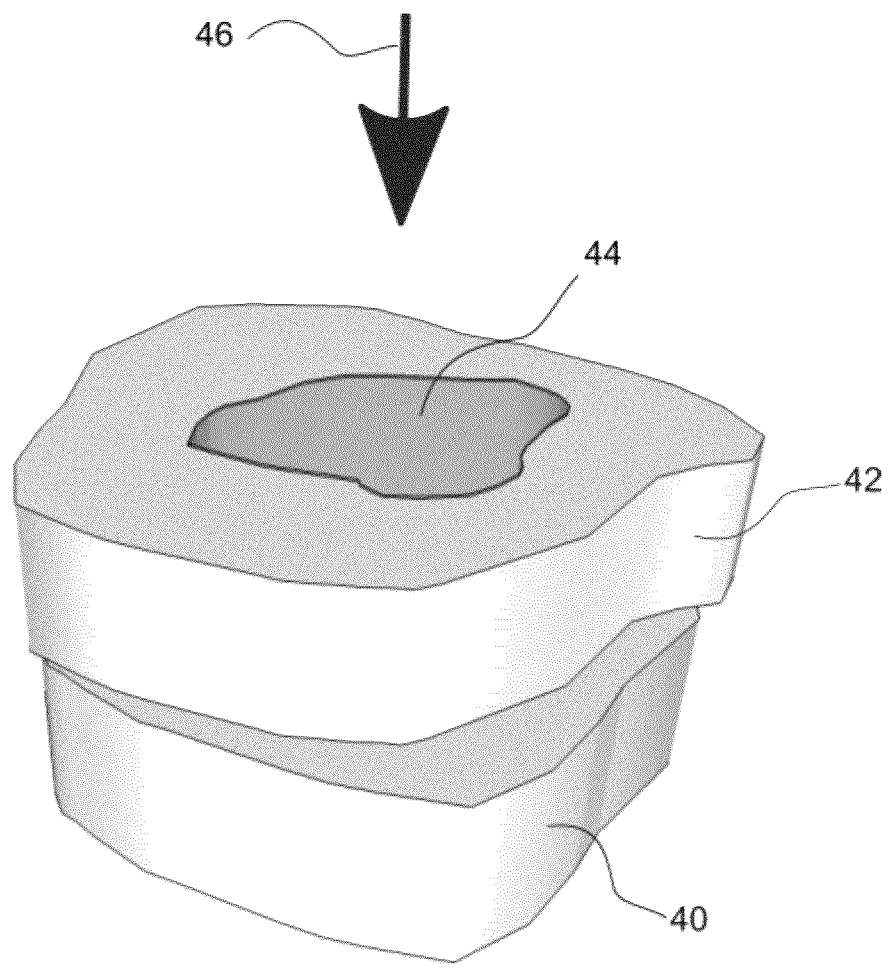
FIG. 3 shows a simple method of freezing a super-cooled liquid layer by creating a liquid disturbance through light absorption.

In another embodiment, the freezing of a super-cooled liquid layer is initiated by utilizing a laser pulse having an optical spectrum that partially or completely overlaps with the absorption spectrum of the liquid sample. FIG. 3 shows a schematic of the concept. A substrate 40 and a cover 42 that respectively correspond to substrate 10 and 14 described in relation to FIGS. 1A to 1D squeeze a layer of a super-cooled liquid sample similarly to the situation shown in FIG. 1C. In this case, either substrate 40 or cover 42 have a transparent window 44 that provides an optical path for a laser pulse 46 that becomes absorbed at least partially in the super-cooled liquid sample.

Absorption of the laser pulse rises the local temperature within the absorption volume of the super-cooled liquid thus creates thermo-elastic stress. That stress and the subsequent stress relaxation in the liquid provide needed disturbance for freezing the super-cooled liquid layer. The laser pulse duration should be short enough in order for the induced thermo-elastic stress to be strong enough to initiate nucleation. For example, for sample thicknesses d and speed of sound inside the super-cooled layer c, the laser pulse duration on the order of d/c or shorter will create a localized thermo-elastic stress leading to an acoustic relaxation within the liquid. The energy of the laser pulse should be chosen to be large enough to create sufficient acoustic disturbance for initiation of freezing but that laser energy should be low enough to avoid overheating the liquid sample that can lead to unwanted sample modification.

Once a frozen sample layer is formed and exposed after removing the cover object, there could be an issue of undesirable gradual change of the frozen layer thickness and composition. This happens when partial vapor pressure of some of the constituents the frozen sample layer immediately above the sample layer is different than the saturation vapor pressure at the local temperature. In that case, there is a difference between fluxes of the constituent molecules that get evaporated from the sample layer and those constituent molecules that get condensed on the sample layer; if this difference between the fluxes is large, the geometry and composition of the sample layer may significantly change during the sample analysis process which is not desirable. The sample constituents that can be typically out of such evaporation/condensation balance are matrix materials consisting of light molecules such as water or alcohol. The sample constituents that have unknown properties and are subject of analysis are typically made of heavy molecules which don't evaporate easily. The physics of evaporation and condensation of this process is well known to the person having ordinary skill in the art.

Figure 5:
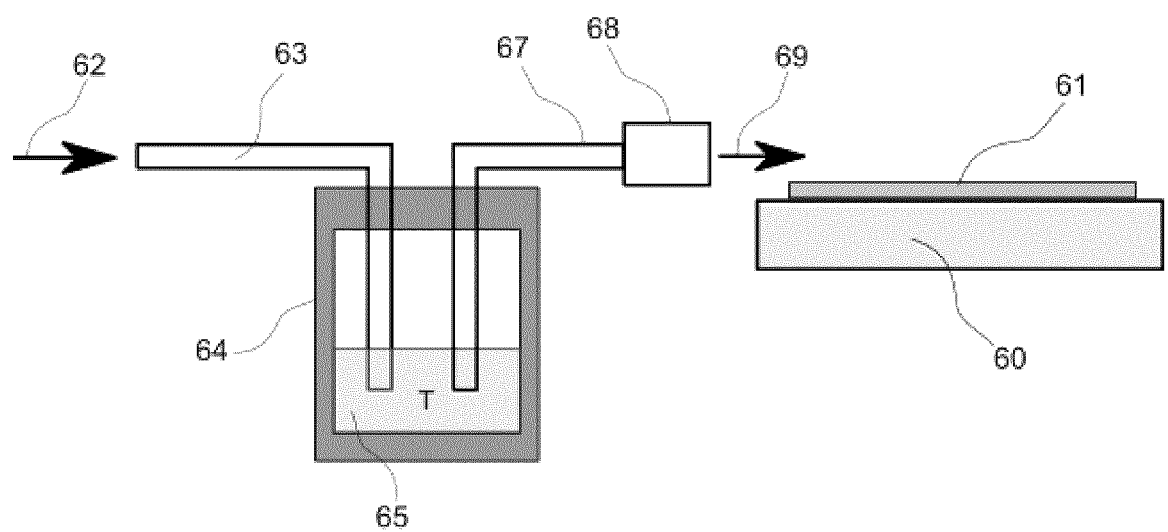
FIG. 5 shows a schematic of a system for creating saturated vapor condition above a frozen sample layer that serves to minimize evaporation of the sample layer or condensation on the sample layer thus stabilizing the sample layer geometry and composition.

In order to prevent these undesirable effects, an environmental cell can be built around the space containing the frozen layer with controlled atmosphere and where the concentration of the constituent molecules in the gas phase is kept at the saturated level. Designs of such environmental cells are known to the person having ordinary skill in the art. A schematic of a possible alternative way of keeping the thickness and composition of the sample layer approximately stable is shown in FIG. 5. A frozen sample layer 61 is created on a substrate 60 where sample layer 61 and substrate 60 correspond to frozen sample layer 29 and substrate 10 described in relation to FIGS. 1A to 1D. A gas flow 69 is introduced over sample layer 61 where gas flow 69 introduces concentration of sample matrix molecules (like water or alcohol) that is approximately equal to saturated values of these concentrations above the sample layer. In this way, the balance between evaporation and condensation of sample matrix molecules is achieved.

Gas flow 69 with desired molecular concentration values can be produced using a version of a bubbler device used in metal organic chemical vapor deposition and which design is known to the person having ordinary skill in the art. A bubbler is a sealed vessel 64 that contains the sample matrix material in liquid form 65. The inlet tube 63 delivers a carrier gas 62 (such as $N_2$ or Ar) and ends just before bottom of liquid 65. As carrier gas 62 bubbles through liquid 65, liquid 65 will evaporate. The mixture of carrier gas 62 and the vapor coming from liquid 65 leaves vessel 64 through an outlet tube 67. The temperature of liquid 65 inside vessel 64 is controlled by a thermostat, so that a defined constant vapor pressure can be achieved thus defining the concentration of matrix molecules coming out of tube 67. The mixture of carrier gas 62 and matrix vapor 69 is delivered over frozen sample layer 61 through a system of tubes and channels 68 which are shaped in such a way that the density of delivered matrix vapor is approximately constant over sample layer 61.

Analyzing the Sample Layer

Figure 6A:
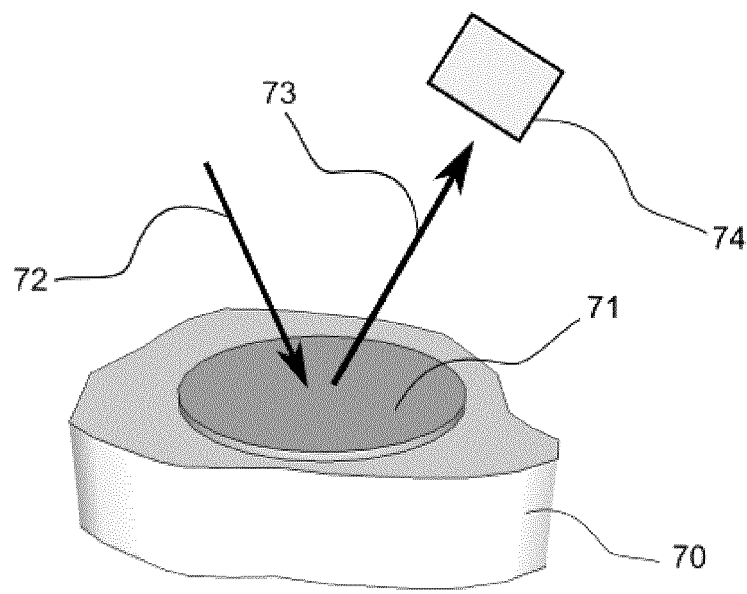
FIGS. 6A and 6B show a schematic of probing a thin sample layer with an optical, electromagnetic, or particle probe after production of the frozen sample layer and removal of the cover with FIG. 6A showing a detector positioned to detect a reflected probe beam and FIG. 6B showing a detector positioned to detect a transmitted probe beam.
Figure 6B:
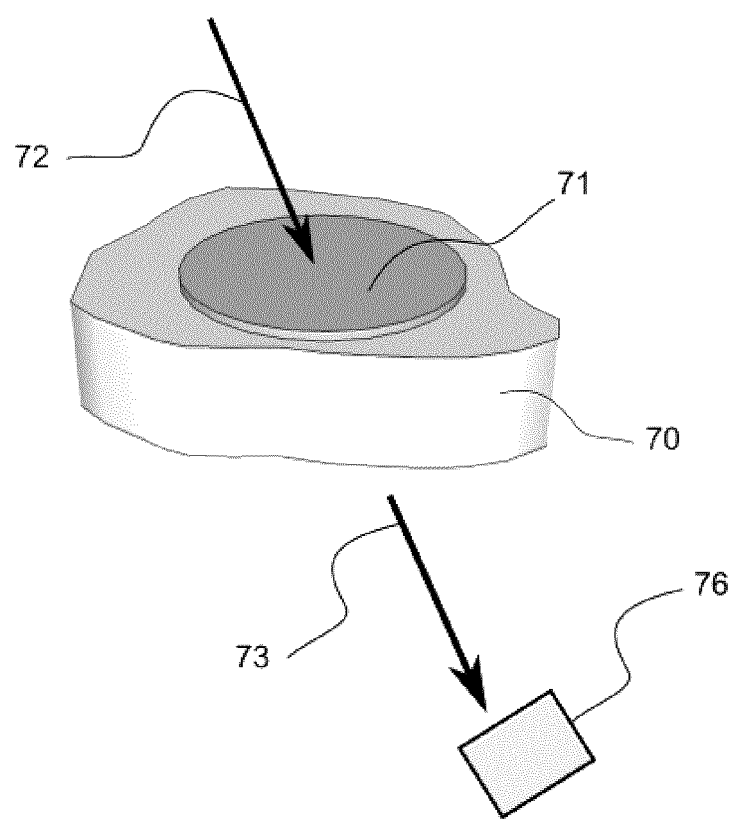

Once a frozen sample layer is formed on a flat surface of a substrate, that sample layer can be probed or modified for analytical purposes. A simple schematic of probing the sample layer is shown in FIGS. 6A to 6B. A frozen sample layer 71 is formed on a substrate 70 as described above. A probe 72 is incident on frozen sample layer 71 and after passing through sample layer 71 it gets modified in a way that carries useful information about sample layer 71 (such as but not limited optical absorption, transmission etc.). The probe 72 can be of any type known to people skilled in the art. Examples include various optical probes, charged particle probes, electromagnetic probes, and nuclear resonance probes.

After interacting with sample layer 71, probe 72 can be reflected by sample layer 71 or reflected by substrate 70 and then it leaves the sample layer as modified probe 73 which gets subsequently detected by detector 74 as shown on FIG. 6A. Alternatively, in case substrate 70 is completely or partially transparent to modified probe 73, modified probe 73 can pass through substrate 70 and subsequently be detected by detector 76 as shown in FIG. 6B.

Figure 7A:
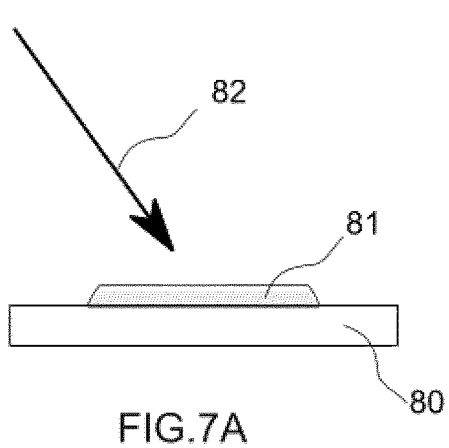
FIGS. 7A to 7E show schematic drawings of the production of laser ablation plumes (7A to 7D) and a configuration for analyzing the sample layer content using a detector positioned closed to the laser ablation plume for doing subsequent plume analysis.
Figure 7B:
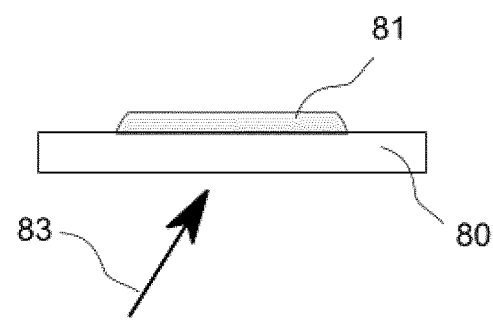
Figure 7C:
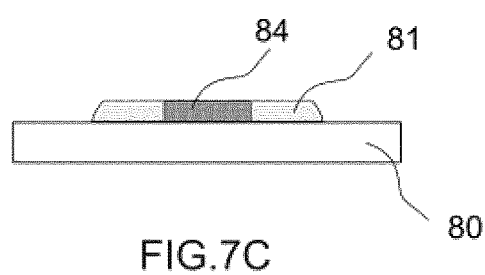
Figure 7D:
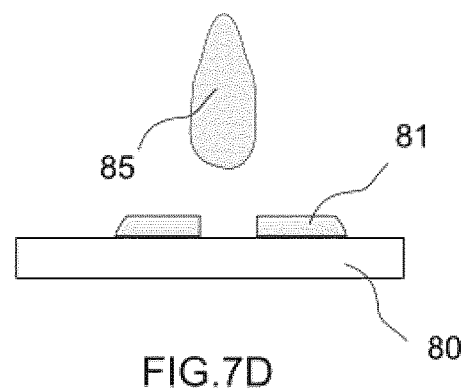
Figure 7E:
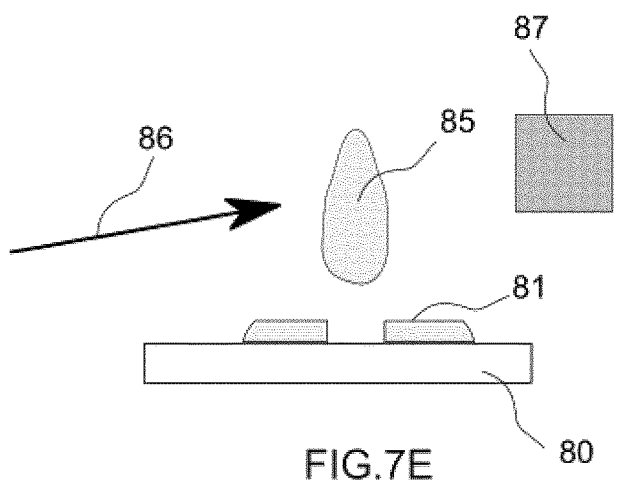

In an additional embodiment, the frozen sample layer may be analyzed utilizing the process shown in FIGS. 7A to 7E. In this embodiment, the method comprises two sequential steps. In the first step, a laser pulse 82 is directed towards a frozen sample layer 81 that is deposited on a substrate 80 where the frozen sample is created in the manners described throughout this text. The optical spectrum of laser pulse 82 is chosen so the majority of energy of laser pulse 82 is absorbed in sample layer 81. The laser pulse 82 can be incident at sample layer 81 from the opposite side of substrate 80 as shown on FIG. 7A. Alternatively, the laser pulse 82 can approach the sample layer through substrate 80 in case substrate 80 is sufficiently transparent to laser pulse 82 as shown on FIG. 7B. The energy of laser pulse 82 is chosen to bring the excited portion 84 into a superheated state causing the ablation of excited portion 84. The physics of laser ablation is known to the person having ordinary skill in the art. Referring to FIG. 7D the ablated portion 85 of sample layer 81 that is then ejected into the surroundings to form what is known as a plume. The resultant plume from the laser ablation contains the analytic molecules of interest which can be probed with a probe 86 as shown in FIG. 7E. Non-limiting examples of probe 86 include various optical probes, charged particle probes, electro-magnetic probes, and nuclear resonance probes. After interaction with plume 85, probe 86 in detected with detector 87 and subsequently analyzed.

FIGS. 8A to 8C show a schematic of a special case of sample analysis described in relation to FIGS. 7A to 7E. A plume 92 is created by laser ablation of a frozen sample layer 91 deposited on a substrate 90 where frozen sample layer 91 is created in manners described throughout this text. The absorbed energy of the ablative laser pulse is big enough that at least some of the molecules in the plume are in the gas phase. Then an ionizing agent 94 is directed towards plume 92 where ionizing agent 94 ionizes at least some of the plume molecules. The ionizing method could be for example, electro-spray ionization (ESI), APCI, APPI, UV, etc. The cloud of such created ions 96 is then directed towards a mass spectrometer 98 where these ions are analyzed. The ionizing agent 94 can be any used in any mass spectrometry which is known to a person having ordinary skill in the art.

Figure 9:
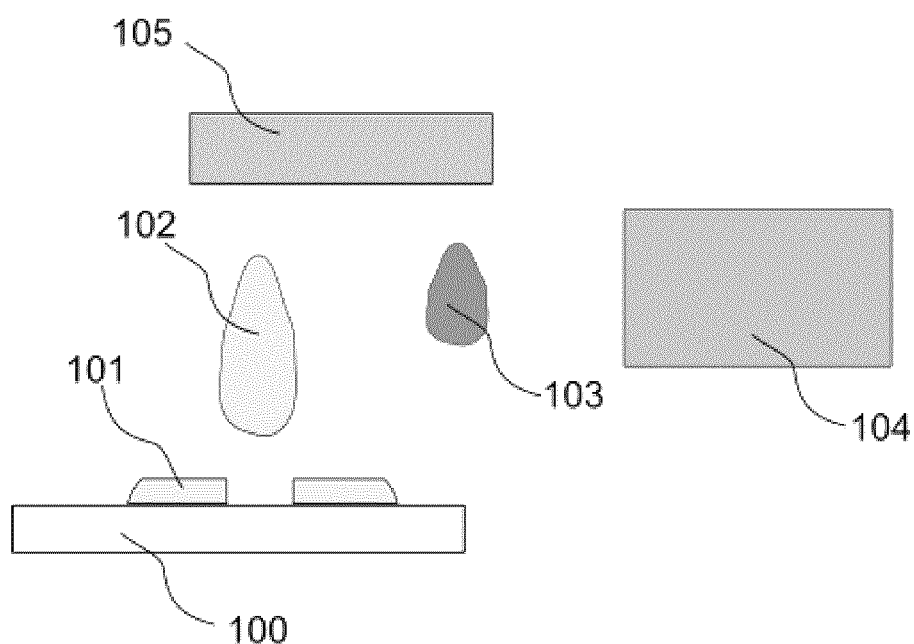
FIG. 9 shows a schematic of a set up that facilitates the mass spectrometric analysis of the plumes through presence of static and/or dynamic electromagnetic fields during and after the gas molecule ionization.

In an embodiment of the sample analysis procedure shown in relation to FIGS. 8A to 8C is shown in FIG. 9. A plume 102 is created by laser ablation of frozen sample layer 101 deposited on a substrate 100. Various molecules suspended in the plume 102 are ionized creating an ion cloud 103 that is captured and analyzed by a mass spectrometer 104. A new element relative to the system described in relation to FIGS. 8A to 8C is an electromagnetic system 105 that creates static and/or dynamic electromagnetic fields during the ionization process and/or during the transport of ion cloud 103 towards mass spectrometer 104. The role of the electromagnetic system 105 is to facilitate ionization and ion transport.

The device and method disclosed herein for sample preparation may be used for the preparation and analysis of any sample that contains a substantial amount of liquid. Examples include bio-fluids such as blood, serum, plasma, saliva, urine, cerebrospinal fluid (CSF); a single or multiple biological cells either alone or within a liquid buffer; industrial materials such as crude oil; the liquid sample will be a bio-fluid such as blood, serum, plasma, saliva, urine, or cerebrospinal fluid (CSF).

FIGS. 10A to 17 show exemplary embodiments of the concepts discussed in relation to FIGS. 1 to 9. Simple supporting components such as screws, wires, tubing, and some O-rings are not shown on FIGS. 10A to 17 to make the drawings clearer. Integration of such simple components is straightforward engineering and known to a person skilled in the art.

Figure 10A:
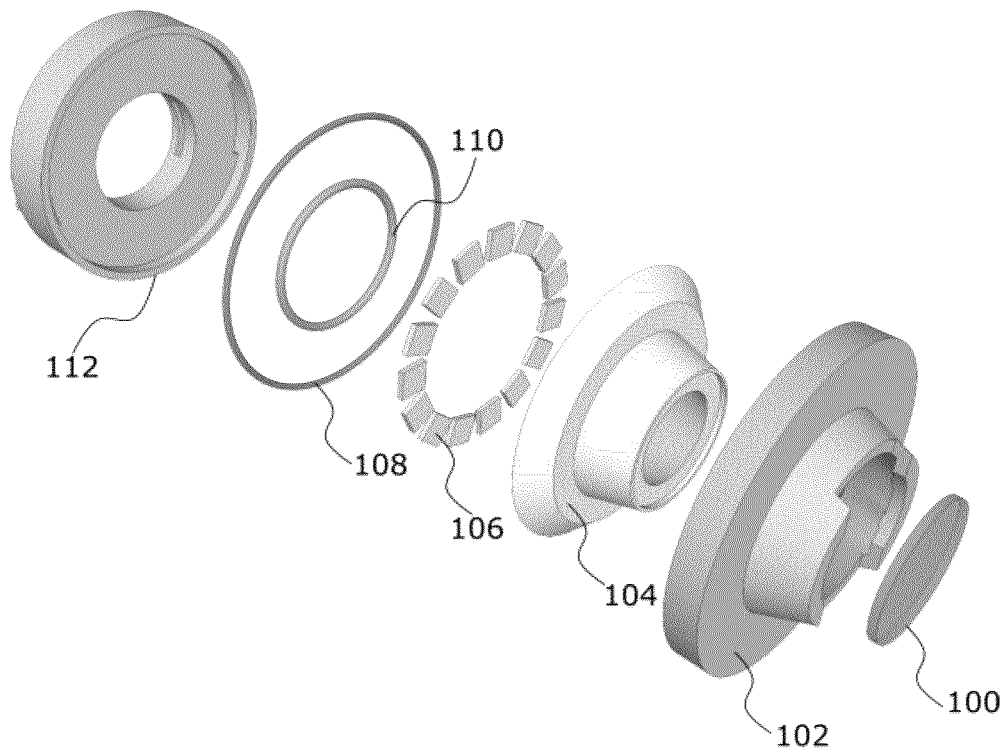
FIGS. 10A and 10B show 3D image rendering of main components of an exemplary embodiment ("the integrated module") and indicate their relative positions in the embodiment assembly.

FIG. 10A shows main components of a thin sample layer integrated module ("the integrated module"). Flat sapphire window 100 is 2-3 mm thick and has 20-50 mm in diameter. It is placed in thermal contact with cold plate 104. The other side of the cold plate 104 is placed in thermal contact with a plurality of thermo-electric coolers (TEC) 106. The other side of the plurality 106 is placed in thermal contact with a heat sink 112.

The thermal contacts between the sapphire the cold plate, the cold plate and the plurality of TEC, and the plurality and the heat sink can be enhanced by using thermal interface materials such as indium foil or thermal paste as known to a person skilled in the art. Using indium foils has an additional advantage to relieve mechanical stresses when the components of the integrated module are pressed together. A cover 102 is used to press the components of the integrated module together and also to provide thermal isolation of the cold internal components from the outside environment. It can be made of ceramic (such as Macor) or hard plastic (such as PEEK). O-rings 108 and 110 seal the interface between cover 102 and heat sink 112.

Figure 10B:
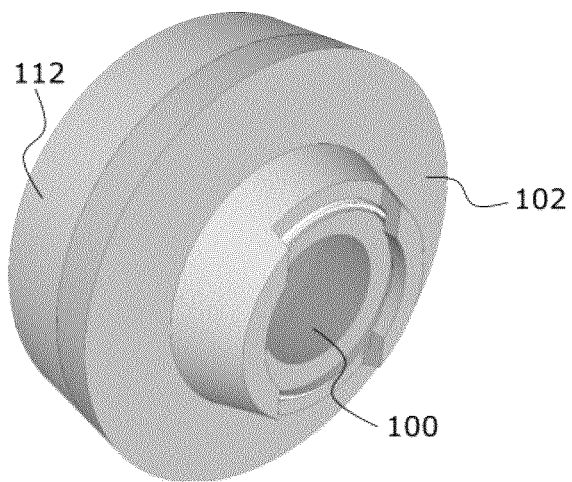

FIG. 10B shows the assembled integrated module.

Figure 11A:
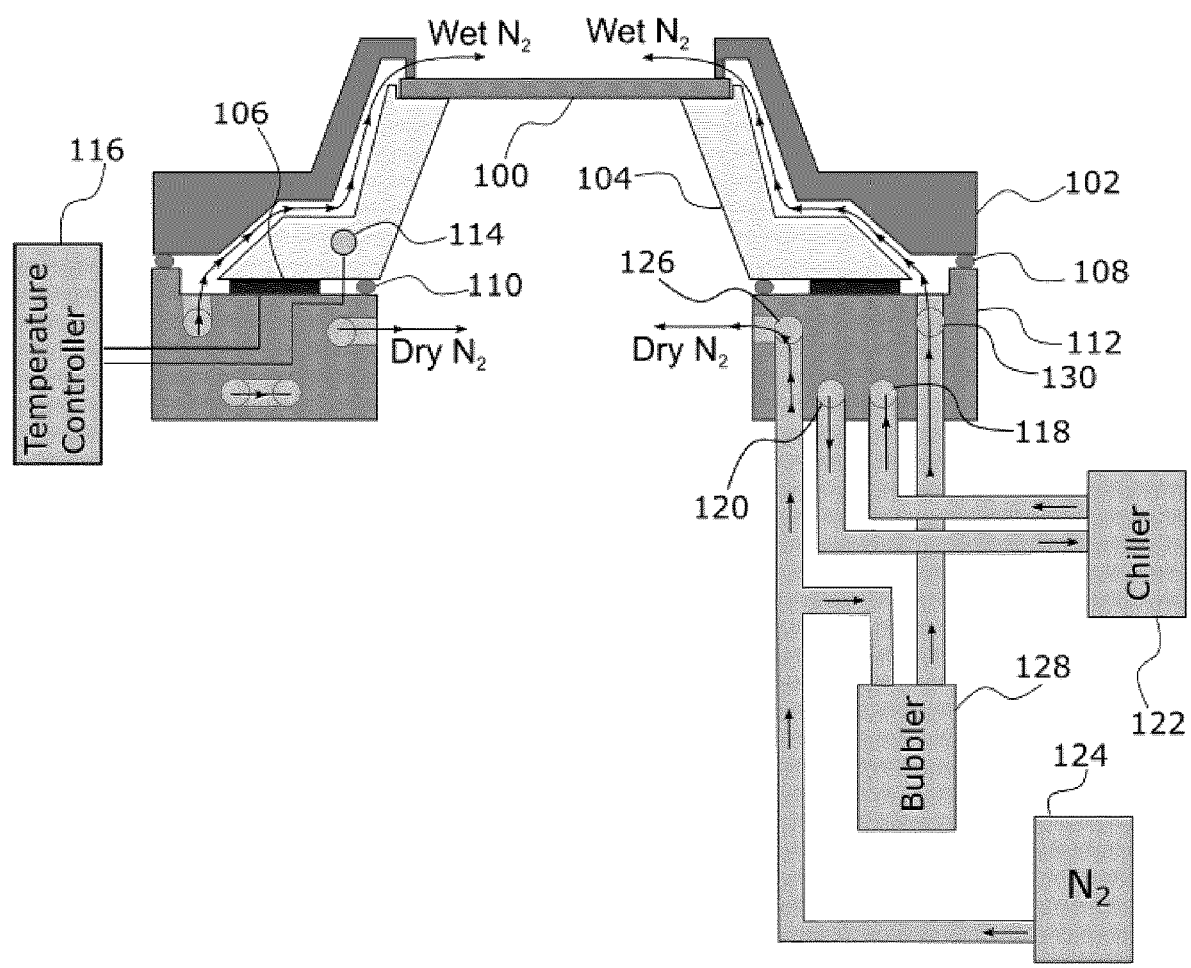
FIGS. 11A and 11B show schematic drawings of the integrated module components in more detail.

FIG. 11A shows a cross section schematic of the integrated module together with supporting external systems. A thermal sensor (such as thermistor) 114 is inserted into cold plate 104 to measure its temperature. The thermal sensor 114 and plurality of TEC 106 are interfaced with an external temperature controller 116. Temperature controller 116 measures the temperature od cold plate 104 through thermal sensor 114 and drives plurality of TEC to keep cold plate 104 at a predetermined temperature $T_{CP}$.

In this way, the temperature of the cold plate 104 and sapphire window 100 can be controlled and set to a temperature below the freezing point of water.

The individual thermo-electric elements within plurality of TEC 106 can be connected in series or parallel depending on desired values of voltage and current at the output of temperature controller 116 for certain amount of electric power needed to drive plurality of TEC 106. Since plurality of TEC 106 generate heat on the opposite side from the contact with cold plate 104, that heat has to be removed with heat sink 112. The skills required to integrate temperature sensor 114, plurality of TEC 106, temperature controller 116, cold plate 104, and heat sink 112 are known to a person skilled in the art. The heat from heat sink 112 is removed by a cooling system constituting of a fluid (such as water) entering heat sink 112 through a connection point 118 and exiting through an exit point 120; and a chiller 122 that keeps the fluid temperature at a certain predetermined value. In case the integrated module is used under atmospheric conditions, care must be taken to avoid condensation of air humidity on cold surfaces of the integrated module. This is accomplished by blowing a dry inert gas (such as $N_2$) over these cold surfaces. An $N_2$ source (such as a gas cylinder) provides dry $N_2$ gas that enters the integrated module through a connection point 126 and then exits at the back of the integrated module in vicinity of its cold surfaces. Also, the environment around a thin sample layer deposited on the top of sapphire window 100 must maintain certain concentration of water vapour in case of biological samples to avoid extensive evaporation of the sample layer or condensation on it as discussed in relation to FIG. 5.

Figure 11B:
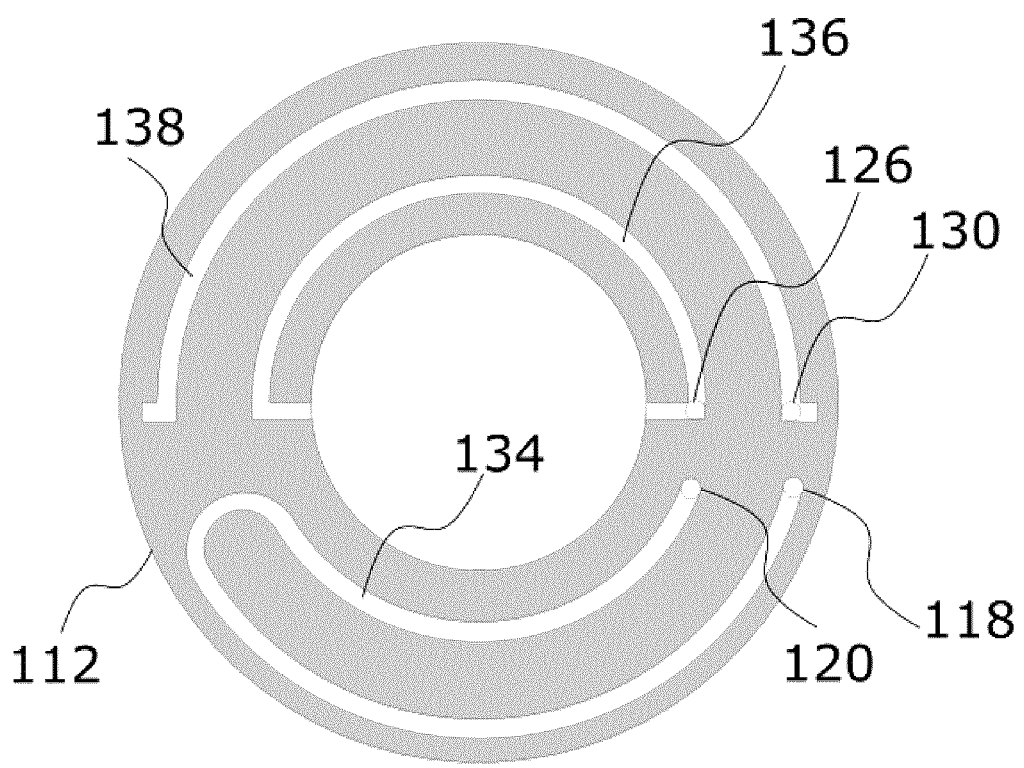
Figure 12A:
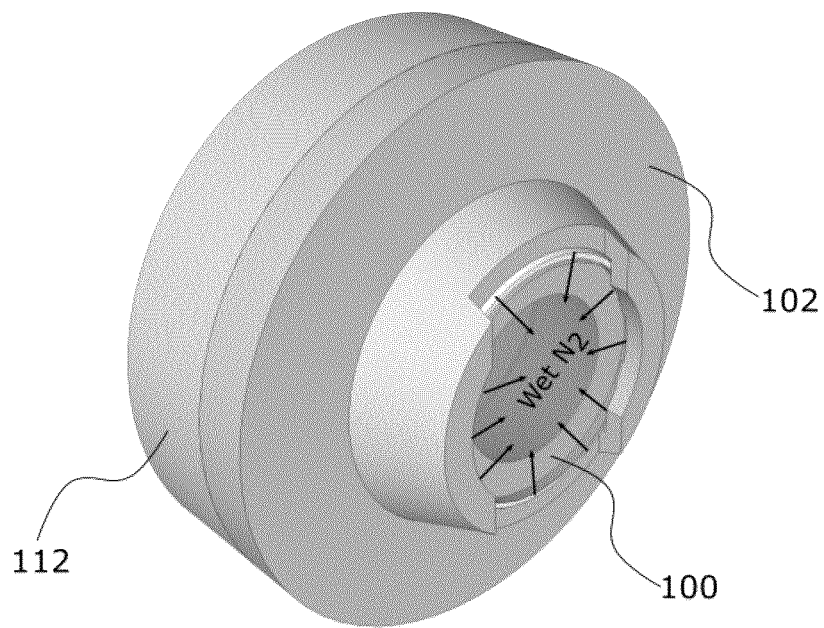
FIGS. 12A and 12B show schematic drawings of directions of gas flows around the integrated module.
Figure 12B:
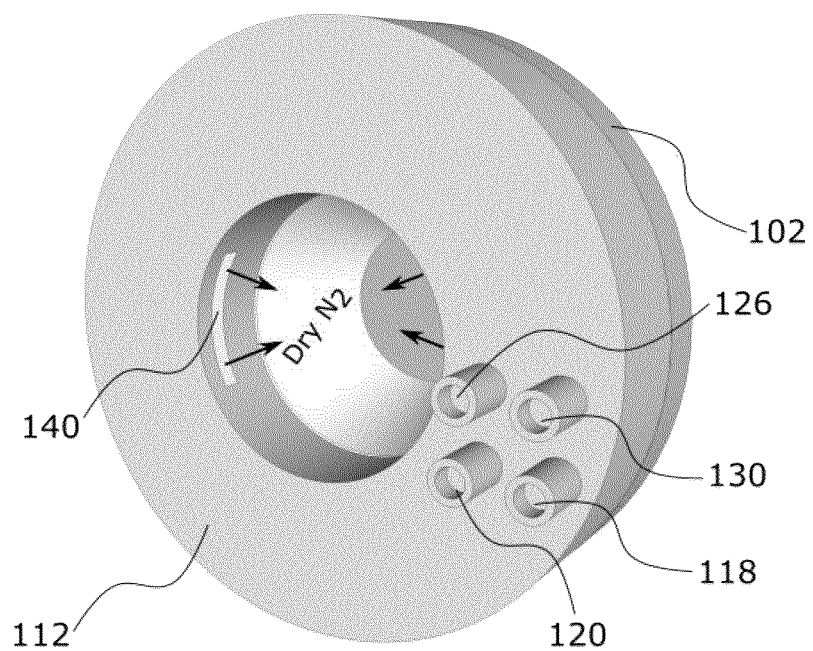
Figure 13A:
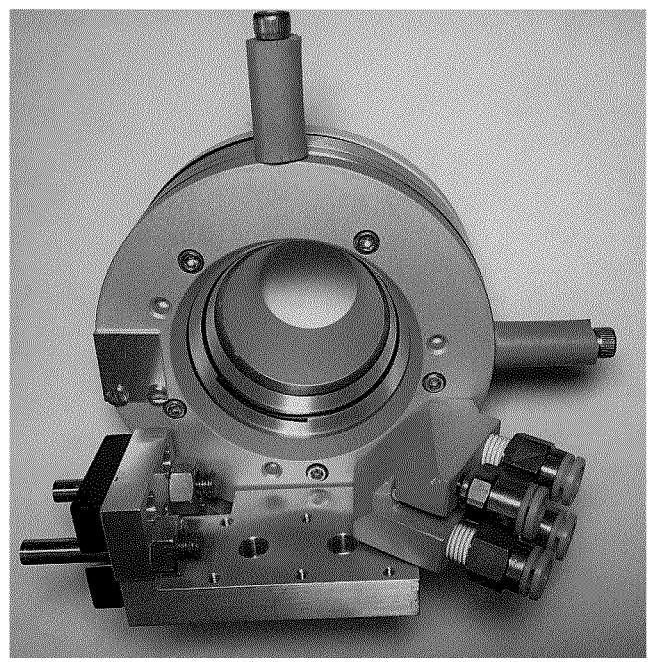
FIGS. 13A and 13B show photos of an integrated module prototype.
Figure 13B:
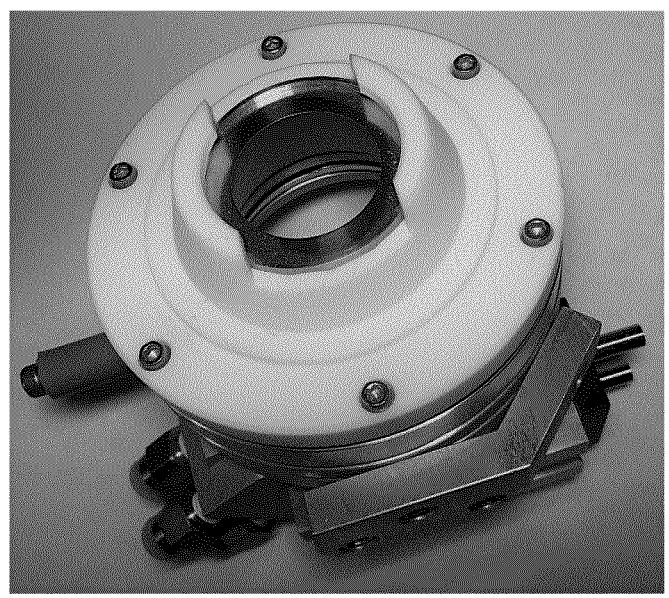

A bubbler 128 takes dry $N_2$ as the input and provides wet $N_2$ output containing desired concentration of water vapor as discussed in relation to FIG. 5. The wet $N_2$ enters the integrated module through a connection point 130 and exits the integrated module in vicinity of a thin sample layer on top of sapphire window 100 providing the desired concentration of water vapour. The surface of cold plate 104 and plurality of TEC 106 that are exposed to the flow of wet $N_2$ can be coated with a thermally insulated material to avoid internal condensation. FIG. 11B. shows a cross section of heat sink 112 indicating the geometry of internal channels for cooling fluid, dry $N_2$, and wet $N_2$. FIG. 12A indicates the flow directions of wet $N_2$ gas on the top of the sapphire window 100 where a sample thin layer is positioned. FIG. 12B indicates the flow of dry $N_2$ at the back of the integrated module. FIGS. 13A and 13B show back and front a real integrated module, respectively (with the sapphire window missing). FIGS. 14A-14E show the process of depositing a thin sample layer on the sapphire window 100 of the integrated module. The integrated module assembly without sapphire window 100 is shown as a single element 142 for drawing simplicity.

Figure 14A:
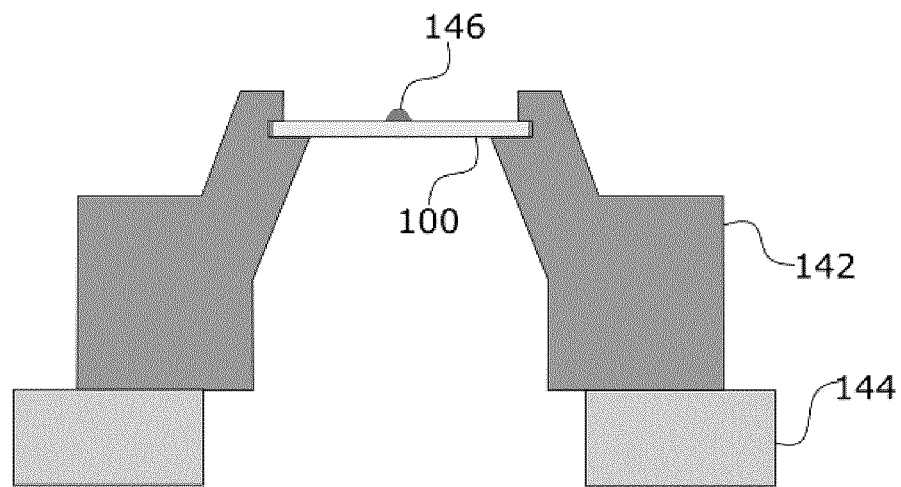
FIGS. 14A to 14E show schematic drawings of an exemplary process that creates a frozen thin film of sample from a liquid thin film of sample.
Figure 14B:
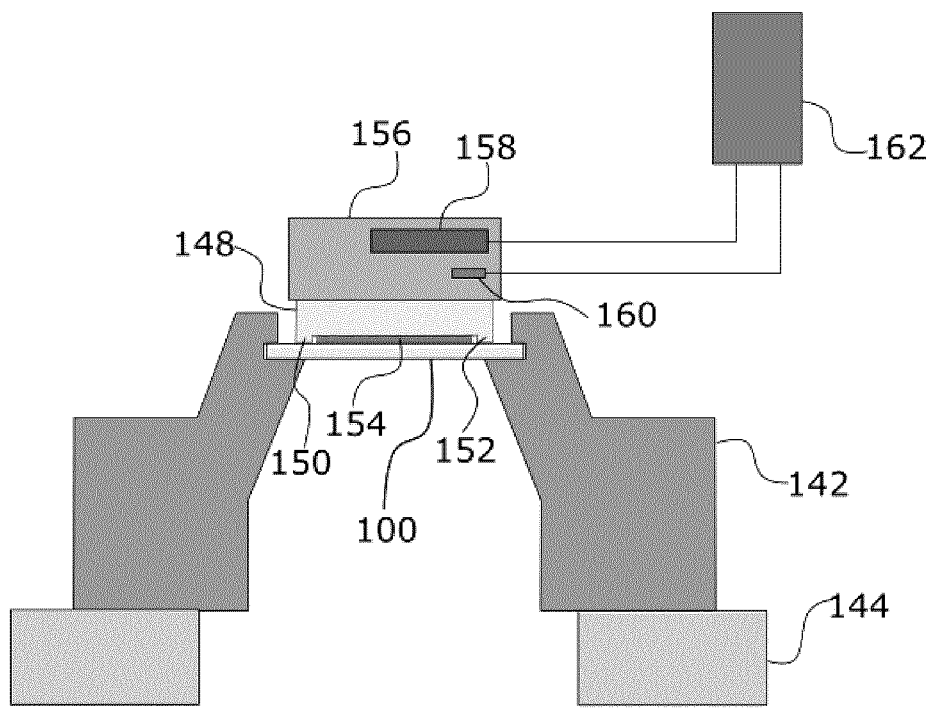
Figure 14C:
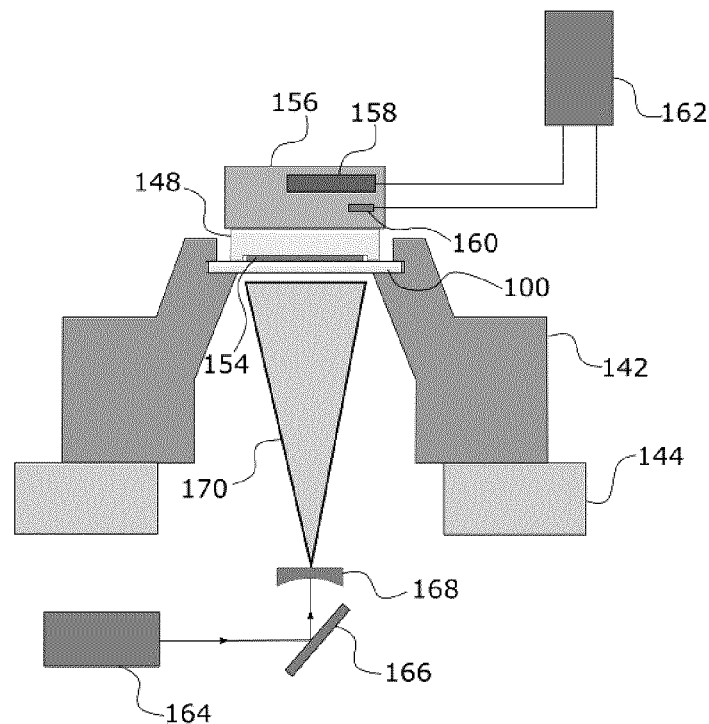
Figure 14D:
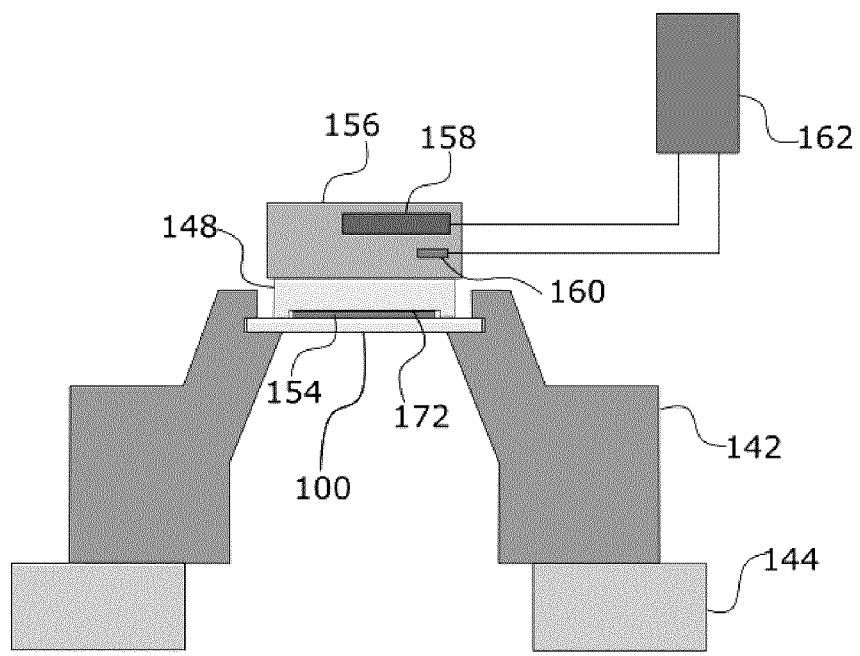
Figure 14E:
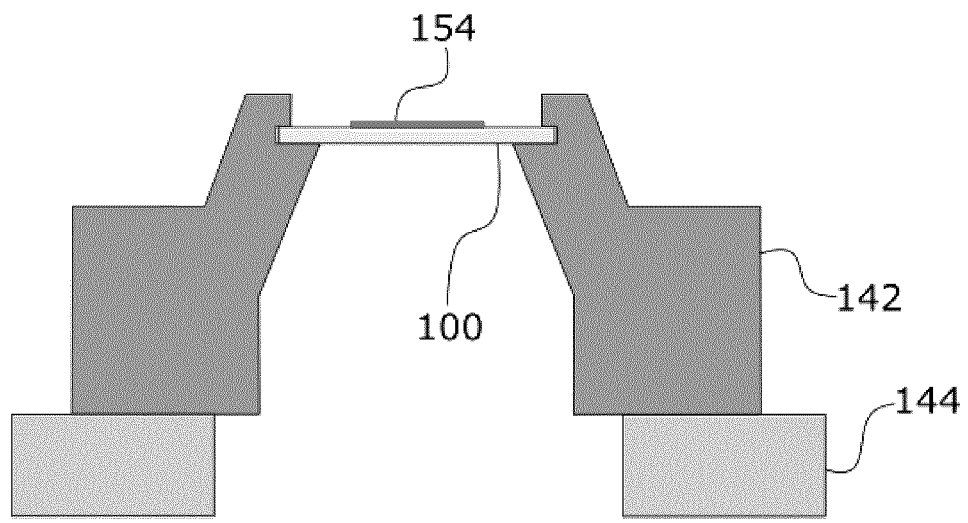

FIG. 14A shows the integrated module placed on a supporting structure 144 with a small amount of sample placed 146 on the top of sapphire window 100. The amount of sample is determined based on the system geometry as discussed previously. FIG. 14B shows a cover module placed on the top of the sapphire window 100. A silicon flat object 148 containing feet 150 and 152 is placed in close contact with sapphire window 100. Creation of such flat surface and contact feet was discussed previously in the text. Due to close contact, the sample spreads between flat surface of silicon object 148 and sapphire window 100 with sample thickness being equal to the thickness of feet 150 and 152. The silicon object is placed in close thermal contact with a metal support object 156 which contains a heating element 158 and a thermal sensor 160. Heating element 158 and a thermal sensor 160 are interfaced with a temperature controller 162; in this way, the temperature of flat silicon object 148 can be controlled. Initially, the heating element 158 is kept off while the temperature of sapphire window 100 and sample layer 154 are brought below the water freezing point. Since, as discussed before, for real samples the actual freezing temperature is not always deterministic, a disturbance is introduced in the supercooled thin sample layer as shown in FIG. 14C. A pulsed infrared laser 164 produces a laser pulse that gets directed towards the sample layer using a steering mirror 166. The wavelength of the laser pulse is chosen to be strongly absorbed in the thin sample layer (for example 3 μm wavelength in case of water). The laser beam is made divergent by using a divergent lens 168. In this way, the laser beam has large diameter when it hits the sample layer creating a 1D disturbance. The laser pulse energy is chosen so the temperature of the sample layer doesn't become higher than the sample melting point. The laser pulse duration is chosen to be short enough so non-uniform thermos-elastic stress is formed within the sample layer immediately after the laser pulse absorption. In this way, an acoustic disturbance is created leading to freezing of the supercooled sample layer as discussed previously in the text. FIG. 14D shows the situation after freezing of the sample layer when the temperature of the silicon object 148 is increased by temperature controller 162. As discussed previously, if the temperature of silicon object 148 is raised slowly while the temperature of sapphire window 100 is kept below the freezing point at a certain point a melted sample sub-layer 172 is formed immediately next to silicon object 148. In this way, strong adhesion between frozen sample layer 154 and silicon object 148 disappears and silicon object 148 can be removed; thus leaving the thin sample layer 154 on silicon window as shown in FIG. 14E.

Figure 15A:
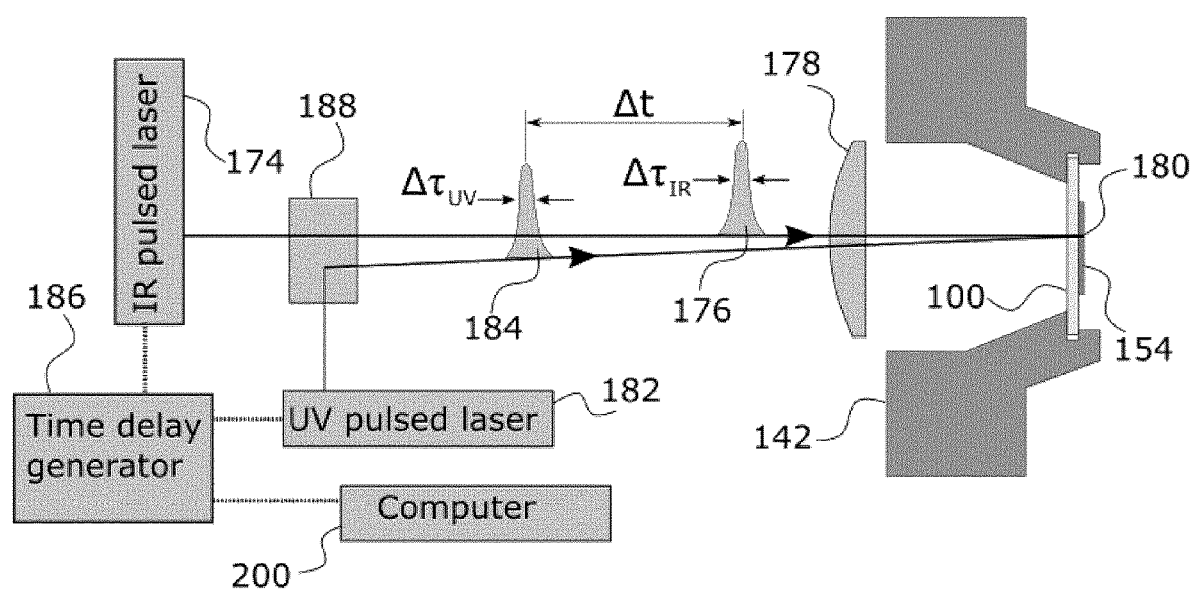
FIGS. 15A to 15C show schematic drawings of an exemplary process for photoionizing laser plumes that originate from laser ablation of frozen thin film of sample.
Figure 15B:
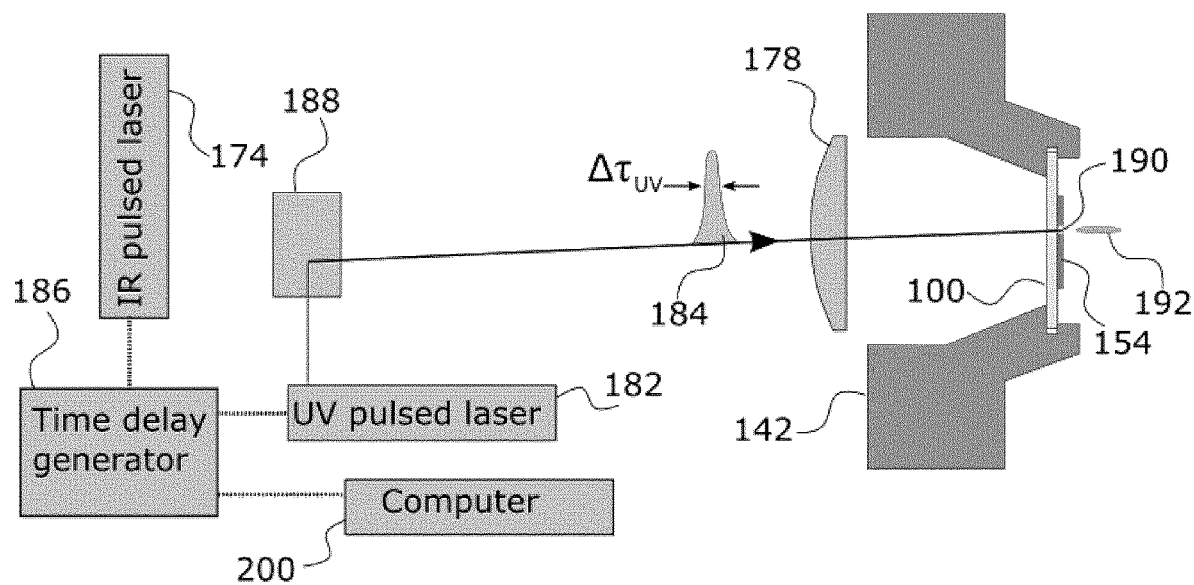
Figure 15C:
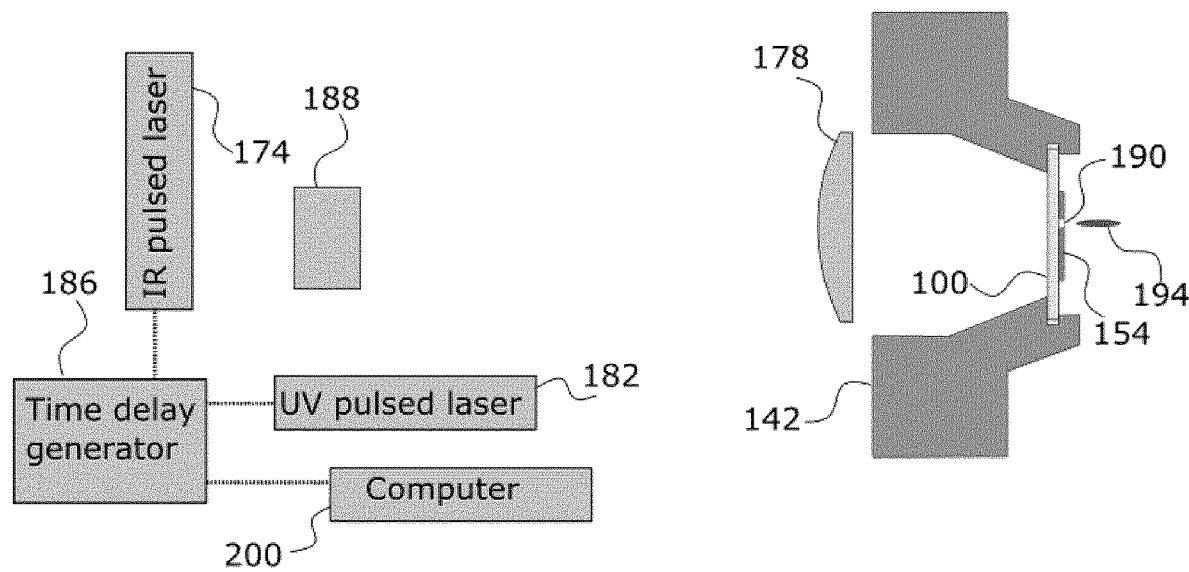
Figure 16:
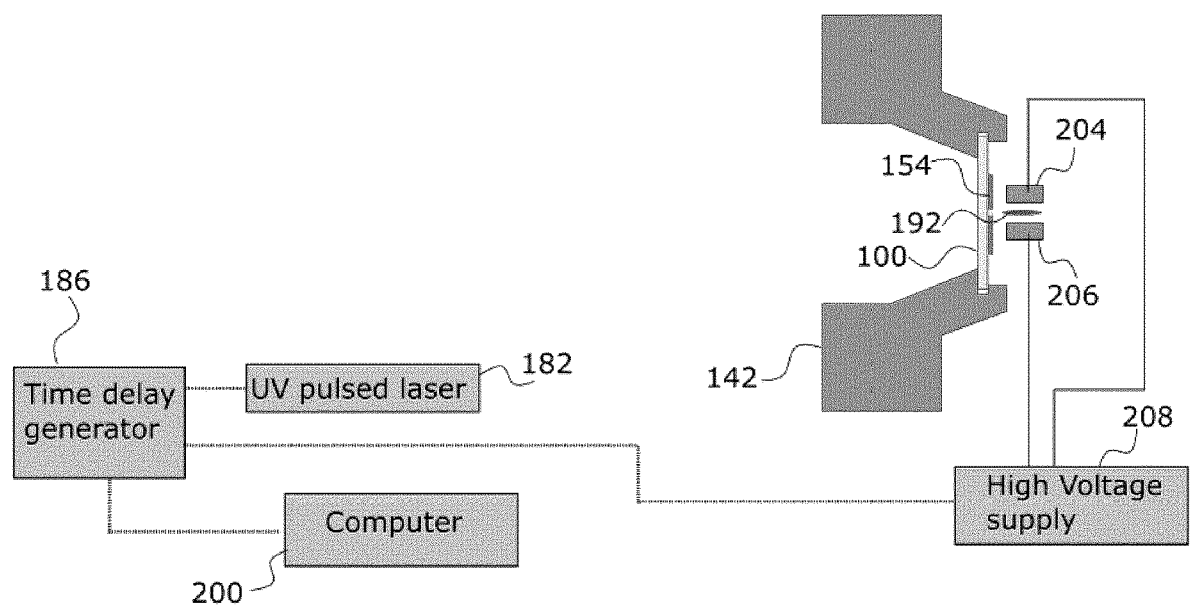
FIG. 16 shows a schematic drawing of an exemplary process for photoionizing laser plumes that originate from laser ablation of frozen thin film of sample with additional high voltage electrodes in the vicinity of the expanding laser plume and where said high voltage electrodes create delayed extraction field facilitating the photoionization process.

FIGS. 15A-C show a system for ablating the frozen sample layer and subsequent photo-ionization of the laser plume. FIG. 15A shows the first phase of the process. Frozen thin sample layer 154 is deposited on sapphire window 100 that is kept at below sample freezing temperature using integrated module 142. Supporting systems for integrated module shown in FIG. 11A are not shown in FIG. 15A for drawing simplicity but it is assumed that these supporting systems are present. An infrared laser 174 produces a laser pulse 176 with pulse duration $\Delta\tau_{IR}$ which is directed towards the sample layer 154 and focused on it using a focusing lens 178. The laser pulse duration is chosen to be shorter than $d_{SL}/v_{SL}$ where $d_{SL}$ the sample layer thickness and $v_{SL}$ is the speed of sound in sample layer 154 so the laser ablation occurs impulsively. The laser pulse energy is chosen to be sufficient for thorough vaporization of the ablated portion of the sample layer as discussed previously in the text. Besides infrared laser 174, there is also a pulsed ultraviolet (UV) or visible laser 182 that can produce a laser pulse with duration $\Delta\tau_{UV}$ which is also directed towards the sample layer 154 and focused on the sample layer by using focusing lens 178. Using an optical coupling system 188, the infrared and UV laser beams are aligned to be almost collinear with a possible small angle between them and also to be approximately perpendicular relative to the flat surface of sapphire window 100. The UV laser pulse duration $\Delta\tau_{UV}$ and its energy are chosen to accomplish efficient photo-ionization of laser ablation plumes. Infrared laser 174 and UV laser 182 are controlled by a time-delay generator 186 so relative delay $\Delta t$ between infrared pulse 176 and UV pulse 184 can be controlled. This delay is typically between 0.1 and 2 us. Time delay generator 186 is controlled by a computer 200. As shown in FIG. 15B, the absorption of the infrared pulse causes formation of the laser plume 192. As shown in FIG. 15C, after laser plume is formed, the laser plume is intercepted by the UV laser pulse which causes photo-ionization of a certain portion of sample molecules contained in the laser plume. An example of a photo-ionization process is Resonance-enhanced multiphoton ionization (REMPI). Other photo-ionization processes have been also reported in literature and are known to a person skilled in the art. The optimal UV laser spot size at the laser position and the timing of the UV pulse relative to the plume expansion is best determined experimentally using time resolved photography. As shown in Kresimir Franjic and R. J. Dwayne Miller, "Vibrationally excited ultrafast thermodynamic phase transitions at the water/air interface"; Phys. Chem. Chem. Phys., 2010, 12, 5225-5239, time resolved photography can be used to follow laser plume development in space and time. That information can be used to get optimal overlap between the UV laser pulse and the laser plume.

FIG. 16A shows the photoionization system with an additional subsystem for delayed extraction. The delayed extraction system consists of electrodes 204 and 206 that are positioned with close separation between each other where the separation is on the path of the expanding laser plume 192. The electrodes 204 and 206 are connected to a pulsed high voltage supply 208 so the high voltage supply can create high voltage between electrodes 204 and 206 resulting in big voltage gradient within the separation between electrodes 204 and 206. High voltage supply timing is controlled by time delay generator 186 so it is possible to synchronize the arrival of photoionization UV pulse 184 and occurrence of high voltage between electrodes 204 and 206 in a way that high voltage between the electrodes is present when the UV laser pulse hits the laser plume within the separation between the electrode.

The presence of delayed high voltage field during the mass spectrometry ionization process is called delayed extraction and various embodiments of it have be demonstrated to improve performance of several mass spectrometry techniques such as matrix-assisted laser desorption ionization (MALDI) or resonance-enhanced multiphoton ionization (REMPI).

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

Therefore what is claimed:

1. A method of laser ablation of a liquid sample which avoids production of ablation recoil products, comprising the steps of:
   a) preparing a thin solid layer of a liquid sample by
   i) providing a substrate member having a flat surface and a cover member having a flat surface, and one of said substrate and cover members having spacers of preselected thickness on its flat surface such that when said substrate and cover members are aligned and mated with said flat surfaces facing each other said substrate and cover members are separated by distance equal to the preselected thickness of said spacers,
   ii) depositing a sample volume of the liquid sample on the flat surface of the substrate member and mating the cover member to the substrate member to sandwich the liquid sample between the flat surfaces, and securing the substrate and cover member together;
   b) cooling the substrate and cover members to a temperature below a freezing point of the liquid sample to freeze the liquid sample thereby forming a solid thin film of liquid sample of thickness substantially equal to the preselected thickness of said spacers;
   c) removing the cover member to expose the frozen thin film of sample;
   d) irradiating the exposed frozen thin film of sample with a pulsed laser, said preselected thickness of the frozen thin film of sample is selected such that an absorption length of light emitted by the pulsed laser in the frozen thin film of sample is of an order of the preselected thickness such that an ablation plume of the sample is released from the frozen thin film of sample which is characterized by a lack of ablation recoil products.

2. The method according to claim 1, where the cover member further comprises a non-adhesive coating at its flat surface where said non-adhesive coating facilitates detachment of said cover member from said frozen thin film of sample.

3. The method according to claim 1, where said freezing of the liquid sample is assisted by a disturbance device that creates a mechanical disturbance within said thin film of sample layer during the supercooling phase of said freezing process.

4. The method according to claim 3, where said disturbance device is an ultrasonic transducer.

5. The method according to claim 3, where said disturbance device is a pulsed laser that emits a laser pulse where said laser pulse gets absorbed within said supercooled thin film of sample thus creates a non-uniform thermo-elastic profile within said supercooled thin film of sample and where relaxation of said thermoelastic profile creates a disturbance that causes freezing of said thin film of sample.

6. The method according to claim 1, further comprising directing a flow of a gaseous mixture above the frozen sample, and wherein said gas flow contains molecules that are mostly present in the vapor that evaporates from said frozen sample layer and where partial pressures of said molecules in said gas flow are approximately equal to the saturation vapor pressure of said molecules immediately above the said frozen sample layer thus stabilizing the thickness and composition of said frozen sample layer.

7. The method according to claim 1, wherein said liquid sample is a biosample liquid.

8. The method according to claim 7, wherein the biosample liquid is any one of blood, serum, plasma, saliva, urine and cerebrospinal fluid (CSF).

9. The method according to claim 1, further comprising positioning a detector in proximity to said substrate such that upon production of the laser ablation plume, said detector is configured to detect selected properties of said laser ablation plume.

10. The method according to claim 9 wherein said detector is a mass spectrometer, and including directing an ionizing agent towards the laser ablation plume wherein ionizing agent ionizes at least some of the molecules of the laser ablation plume, and wherein said mass spectrometer is positioned to intercept ionized molecules of the laser ablation plume where they are analyzed by said mass spectrometer.

11. The method according to claim 10 wherein said ionizing agent is based on electrospray ionization (ESI); atmospheric pressure chemical ionization (APCI); atmospheric pressure photoionization (APPI); or photo-ionization.

12. The method according to claim 10, where an additional electromagnetic system is introduced that create electric or magnetic fields that facilitate an ionization process.

13. The method according to claim 12, where said electromagnetic system creates delayed extraction effect.

14. The method according to claim 10 where said plume created through said laser ablation is ejected and probed within vacuum.

15. The method according to claim 10 where said plume created through said laser ablation is ejected and probed within vacuum.

16. The method according to claim 10 where said plume created through said laser ablation is ejected and probed within a surrounding gas that has the pressure level close to the standard atmospheric pressure level.

17. A method of laser ablation of a liquid sample which avoids production of ablation recoil products, comprising the steps of:
- a) preparing a thin solid layer of a liquid sample by
  - i) providing a substrate member having a flat surface and a cover member having a flat surface, and one of said substrate and cover members having spacers of preselected thickness on its flat surface such that when said substrate and cover members are aligned and mated with said flat surfaces facing each other said substrate and cover members are separated by distance equal to the preselected thickness of said spacers,
  - ii) depositing a sample volume of the liquid sample on the flat surface of the substrate member and mating the cover member to the substrate member to sandwich the liquid sample between the flat surfaces, and securing the substrate and cover member together;
- b) cooling the substrate and cover members to a temperature below a freezing point of the liquid sample to freeze the liquid sample thereby forming a solid thin film of liquid sample of thickness substantially equal to the preselected thickness of said spacers;
- c) heating the cover member up to a melting point temperature of the solid thin film of sample such that a surface of the frozen thin film of sample in contact with the optically flat surface of the cover member melts;
- d) removing the cover member to expose the frozen thin film of sample;
- e) irradiating the exposed frozen thin film of sample with a pulsed laser, said preselected thickness of the frozen thin film of sample is selected such that an absorption length of light emitted by the pulsed laser in the frozen thin film of sample is of an order of the preselected thickness such that an ablation plume of the sample is released from the frozen thin film of sample which is characterized by a lack of ablation recoil products.

* * * * *